United States Patent
Hazui et al.

(10) Patent No.: US 11,958,143 B2
(45) Date of Patent: Apr. 16, 2024

(54) WELDING CONTROL DEVICE, WELDING CONTROL METHOD, AND WELDING CONTROL PROGRAM

(71) Applicant: MITSUBISHI HEAVY INDUSTRIES, LTD., Tokyo (JP)

(72) Inventors: Yusuke Hazui, Tokyo (JP); Koki Tateishi, Tokyo (JP); Naoki Suda, Tokyo (JP); Kazuhiko Kamo, Tokyo (JP); Masahiro Kimura, Tokyo (JP); Yusuke Sano, Tokyo (JP); Yasushi Nishijima, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 852 days.

(21) Appl. No.: 17/040,612

(22) PCT Filed: Mar. 25, 2019

(86) PCT No.: PCT/JP2019/012354
§ 371 (c)(1),
(2) Date: Sep. 23, 2020

(87) PCT Pub. No.: WO2019/208054
PCT Pub. Date: Oct. 31, 2019

(65) Prior Publication Data
US 2021/0114131 A1  Apr. 22, 2021

(30) Foreign Application Priority Data
Apr. 25, 2018 (JP) ................................ 2018-083950

(51) Int. Cl.
*B23K 9/00* (2006.01)
*B23K 9/095* (2006.01)
(Continued)

(52) U.S. Cl.
CPC .............. *B23K 9/12* (2013.01); *B23K 9/0956* (2013.01); *G05B 13/0265* (2013.01); *G05B 19/402* (2013.01); *G05B 2219/45135* (2013.01)

(58) Field of Classification Search
None
See application file for complete search history.

(56) References Cited

U.S. PATENT DOCUMENTS

| | | | |
|---|---|---|---|
| 5,283,418 A | 2/1994 | Bellows et al. | |
| 2005/0029326 A1* | 2/2005 | Henrikson | B23K 9/0956 228/103 |

(Continued)

FOREIGN PATENT DOCUMENTS

| | | |
|---|---|---|
| JP | H10-277743 A | 10/1998 |
| JP | 2001-25867 A | 1/2001 |

(Continued)

OTHER PUBLICATIONS

International Search Report dated Jun. 18, 2019, issued in counterpart Application No. PCT/JP2019/012354, with English Translation. (12 pages).

(Continued)

*Primary Examiner* — Paul B Yanchus, III
(74) *Attorney, Agent, or Firm* — WHDA, LLP

(57) ABSTRACT

A welding control device includes an actual position determination part configured to determine an actual position of the position control target on the basis of a weld characteristic amount detected from a captured image captured so as to include at least the position control target, the welding characteristic amount including at least one of a wire position of the weld wire or an electrode position of the electrode; a target position determination part configured to determine a target position being a target of the actual position corresponding to a weld condition for welding the weld target; and a position control part configured to execute (Continued)

a position control of the position control target to bring the actual position to the target position.

22 Claims, 8 Drawing Sheets

(51) Int. Cl.
*B23K 9/12* (2006.01)
*G05B 13/02* (2006.01)
*G05B 19/402* (2006.01)

(56) References Cited

U.S. PATENT DOCUMENTS

| | | | |
|---|---|---|---|
| 2005/0103766 A1* | 5/2005 | Iizuka ................. | B23K 9/0216 219/124.34 |
| 2016/0193681 A1 | 7/2016 | Pesme et al. | |
| 2017/0028499 A1 | 2/2017 | Yoshida et al. | |

FOREIGN PATENT DOCUMENTS

| | | |
|---|---|---|
| JP | 3408749 B2 | 5/2003 |
| JP | 2004-017088 A | 1/2004 |
| JP | 2006-192437 A | 7/2006 |
| JP | 2017-030014 A | 2/2017 |
| JP | 2017-033693 A | 2/2017 |
| JP | 2017-205789 A | 11/2017 |

OTHER PUBLICATIONS

Notification Concerning Transmittal of International Preliminary Report on Patentability (Forms PCT/IB/326) issued in counterpart International Application No. PCT/JP2019/012354 dated Nov. 5, 2020 with Forms PCT/IB/373, PCT/IB/338 and PCT/ISA/237. (18 pages).

The Extended European Search Report dated Jul. 28, 2021, issued to counterpart EP application No. 19791734.7. (9 pages).

* cited by examiner

WELDING CONTROL DEVICE, WELDING CONTROL METHOD, AND WELDING CONTROL PROGRAM

TECHNICAL FIELD

The present disclosure relates to welding control for automation of arc welding.

BACKGROUND ART

In automatic arc welding, where a non-consumable electrode is used while continuously feeding a weld wire to a molten pool, it is necessary to appropriately maintain the relative position between the electrode and a groove (wall surface) of a weld target, as well as the relative position between the position at which the weld wire is inserted into the molten pool and the electrode and the molten pool. For instance, in a case where it is necessary to ensure a high weld quality such as a case of welding parts of equipment for a nuclear power plant, a welder monitors the automatic welding work directly or through a captured image captured by a camera, and performs an intervening operation for adjustment if the weld wire or the electrode becomes misaligned from the appropriate position. If the monitoring and adjusting work typically performed by a welder can be automated, the welding work would no longer need to be performed by hand, and the dependency on the skill of a welder can be reduced.

Patent Document 1 discloses a technique for automating the above monitoring and adjusting work, for instance. According to Patent Document 1, the automatic welding device captures an image of a weld part and obtains the position of a molten pool on the basis of the luminance difference of the image. Further, the automatic welding device controls welding tracking at the groove surface portion by adjusting the tip position of the weld wire in the right-left direction on the basis of the difference between the left end position of the molten pool inside the groove and the left end position of the molten pool at the groove surface portion, and the difference between the right end position of the molten pool inside the groove and the right end position of the molten pool at the groove surface portion. Patent Document 2 discloses automatically generating appropriate conditions by learning the relationship between physical amounts related to arc welding and welding conditions.

Citation List

Patent Literature

Patent Document 1: JP3408749B
Patent Document 2: JP2017-30014A

SUMMARY

Problems to be Solved

According to the technique disclosed in Patent Document 1, it is possible to perform highly-accurate welding by weld tracking with an automatic welding device using a non-consumable electrode. However, when using an automatic welding device that uses a non-consumable electrode, the electrode and the weld wire are provided separately, which leads to complication of the control.

In this regard, the present inventors invented a technique of recognizing the relative relationship between the electrode, the weld wire, the groove, and the molten pool from the image at the time of welding captured by a camera or the like, obtaining the misalignment amount of each relative relationship from the target position, and controlling the positions of an electrode and a weld wire so as to eliminate the misalignment amount. In this case, during automatic arc welding, the heat input state of welding changes depending on the weld conditions (wire feed amount, welding rate, welding current, etc.), and the welding state changes in accordance with the heat input state. Thus, the present inventors found that, it is necessary to determine the above target position in accordance with the difference in the welding conditions. For instance, if the relative distance between the weld wire and the molten pool is controlled be constant, it would be necessary to move the weld wire in a direction toward the electrode in accordance with the change in the amount of the molten pool when the molten pool becomes smaller due to a change in the welding condition, in which case there is a risk of the electrode and the weld wire making contact with each other.

In view of the above, an object of at least one embodiment of the present invention is to provide a welding control device that controls a welding work of a weld target in accordance with a weld condition.

Solution to the Problems (1) According to at least one embodiment of the present invention, a welding control device configured to control a position control target including at least one of a weld wire used in welding of a weld target or an electrode for melting the weld wire includes: an actual position determination part configured to determine an actual position of the position control target on the basis of a weld characteristic amount detected from a captured image captured so as to include at least the position control target, the welding characteristic amount including at least one of a wire position of the weld wire or an electrode position of the electrode; a target position determination part configured to determine a target position being a target of the actual position corresponding to a weld condition for welding the weld target; and a position control part configured to execute a position control of the position control target to bring the actual position to the target position.

With the above configuration (1), the target (target position) of the position control target such as the position of the weld wire or the position of the electrode is determined in accordance with the weld condition. Furthermore, the welding execution device is controlled so as to bring the position of the position control target obtained through image processing of a captured image of the weld state by the welding execution device to the target. For instance, the actual position of the position control target is an actual position detected from the captured image, and may be a position in a coordinate system set on the captured image (absolute position), or a relative position of the wire position or the electrode position being the position of the position control target with respect to another weld characteristic amount (e.g. the molten pool position or the groove position described below). Accordingly, it is possible to automatically carry out arc welding at a welding quality similar to that by a welder, and it is possible to realize automatic welding with reduced dependency on the welder's skill.

(2) In some embodiments, in the above configuration (1), the captured image further includes at least one of a groove of the weld target or a molten pool formed on the groove by melting of the weld wire, the weld characteristic amount further includes at least one of a groove position of the groove or a molten pool position of the molten pool, the actual position includes an actual relative position being a relative position of at least one of the wire position or the electrode position with respect to the groove position or the molten pool position, and the target position includes a target relative position being a target of the relative position corresponding to the weld condition for welding the weld target.

With the above configuration (2), in accordance with the weld condition, the target of two relative positions (target relative position) included in the weld characteristic amount, such as the relative position of the position of the weld wire with respect to the molten pool is determined, for instance. Furthermore, the welding execution device is controlled so as to bring the actual relative position obtained through image processing of the captured image of the weld state by the welding execution device to the target. Accordingly, it is possible to automatically carry out arc welding at a welding quality similar to that by a welder, and realize automatic welding with reduced dependency on the welder's skill.

(3) In some embodiments, in the above configuration (1) or (2), the target position determination part includes: a weld condition acquisition part configured to acquire the weld condition; and a condition-based target determination part configured to determine the target position corresponding to the weld condition, on the basis of a relationship between a previous weld condition at the time of a previous welding and a previous position being the actual position set under the previous weld condition.

With the above configuration (3), learning (machine learning) includes learning accumulation of the corresponding relationship between the record of actual positions such as two relative positions of weld characteristic amounts such as the absolute position of the position control target or the relative position of the weld wire and the molten pool obtained as a result of operation on the position control target such as the weld wire by a welder and the weld condition in that case. Also, on the basis of the result of the learning, the target position is directly obtained from the weld condition. Accordingly, it is possible to appropriately determine the target position. Furthermore, by using the accordingly determined target position in the position control, it is possible realize a welding quality similar to that by a welder.

(4) In some embodiments, in the above configuration (3), the condition-based target determination part is configured to determine the target position corresponding to the weld condition by using a learning model obtained through machine learning of a plurality of sets of data in which the previous weld condition is associated with the previous position set under the previous weld condition.

With the above configuration (4), it is possible to appropriately determine a target position corresponding to a weld condition from the weld condition, by using a learning model generated through machine learning.

(5) In some embodiments, in the above configuration (2), the target position determination part includes: a position-based target determination part configured to determine the target position corresponding to the weld condition from the previous weld characteristic amount, on the basis of a relationship between a previous weld characteristic amount at the time of a previous welding performed under a previous weld condition at the time of the previous welding and a previous position being a relative position of the previous weld characteristic amount.

The heat input condition (heat input state) changes when the weld condition changes, and thus the appropriate positions of the position control targets such as the weld wire and the electrode change in accordance with the weld condition. A welder's operation includes recognizing the characteristic point (e.g. positions of the weld wire or the position of the molten pool) for ensuring the weld quality mainly from the visual information on the weld work state that differs depending on the weld condition, and operating the wire position or the electrode on the basis of their experience, thereby achieving high-quality welding. On the basis of the above findings, the present inventors considered it possible to obtain the target position from a welder's operation history, instead of the weld condition, since the welder's operation should reflect the difference in the weld condition.

With the above configuration (5), the relationship between the record of the weld characteristic amounts such as the position of the molten pool and the position of the weld wire obtained as a result of operation of the position control target such as the weld wire by a welder in a previous welding, and the record of the relative position obtained from the result is learned. Also, on the basis of the result of learning, the target relative position is obtained from the weld characteristic amounts such as the position of the molten pool and the position of the weld wire. Accordingly, it is possible to appropriately determine the target relative position. Further, it is possible to easily address non-experienced weld conditions. Furthermore, by using the accordingly determined target relative position for the position control, it is possible realize a welding quality similar to that by a welder.

(6) In some embodiments, in the above configuration (5), the target position determination part is configured to determine the target position corresponding to the weld condition from the weld characteristic amount, by using a learning model obtained through machine learning of a plurality of sets of data in which the previous weld characteristic amount and the previous position are associated.

With the above configuration (6), it is possible to appropriately determine a target position corresponding to a weld characteristic amount from the weld characteristic amount, by using the learning model generated through machine learning.

(7) In some embodiments, in the above configuration (4) or (6), the target position determination part is configured to determine the target position corresponding to the weld condition from the weld condition or the weld characteristic amount, by using a target value conversion device for obtaining the target position corresponding to the weld condition or the weld characteristic amount, the target value conversion device generated by using the learning model.

With the above configuration (7), it is possible to calculate the target relative position corresponding to the weld condition, while suppressing the amount of calculation.

(8) In some embodiments, in any one of the above configurations (2) to (7), the welding control device further includes a position control necessity determination part configured to determine a necessity of a position control of the position control target on the basis of a difference between the target position and the actual position. The position control part is configured to execute a position control of the position control target on the basis of a determination result by the position control necessity determination part.

With the above configuration (8), the position control of the position control target is performed on the basis of the difference between the target position and the actual position. That is, according to analysis of operation by a welder, when the difference between the target relative position and the actual relative position is out of a predetermined range, such as when the difference of the relative position between the weld wire and the molten pool is too large at the time of welding, the welder carries out an operation to correct the difference, according to their experience. Thus, when the difference between the target relative position and the actual relative position is within a predetermined range, the position control is not performed on the weld wire even if the target position and the actual position are not the same (a control dead zone is set). Accordingly, it is possible to complete welding with fewer operations while achieving a quality similar to that of a welder.

(9) In some embodiments, in the above configuration (8), the position control necessity determination part is configured to determine that the position control of the position control target is necessary, if the difference between the actual position and the target position is out of a predetermined range determined on the basis of a plurality of sets of operation history data in which a previous weld characteristic amount at the time of a previous welding is associated with presence or absence of operation of the position control target related to the previous weld characteristic amount.

With the above configuration (9), the range for determining the necessity of execution of the position control of the position control target is determined on the basis of the relationship between presence or absence of operation of the position of the weld wire carried out by a welder, and the relationship between the position control target and the previous weld characteristic amount such as the relationship between the previous molten pool position and the previous wire position. Accordingly, it is possible to appropriately set the above threshold, and automatically complete welding with fewer operations while achieving a quality similar to that of a welder.

(10) In some embodiments, in any one of the above configurations (1) to (9), the actual position determination part includes: a captured image acquisition part configured to acquire the captured image from a capturing part configured to capture the captured image; a weld characteristic amount detection part configured to detect the weld characteristic amount from the captured image in each of a predetermined control period; and a calculation part configured to calculate the actual position on the basis of the weld characteristic amount.

With the above configuration (10), a captured image is obtained from the capturing part configured to capture the weld part at the time of welding, and the actual position is calculated on the basis of the weld characteristic amount detected through image processing of one or more captured images acquired in each of a predetermined control period. Accordingly, it is possible to calculate the actual position real-time through real-time image processing of the captured images at the time of welding.

(11) In some embodiments, in the above configuration (10), the actual position determination part further includes: a detection abnormality determination part configured to determine a detection abnormality of the weld characteristic amount in each of the control period by the weld characteristic amount detection part. The actual position determination part is configured to: calculate, in a normal control period being the control period in which the detection abnormality is determined to be absent, the actual position on the basis of the weld characteristic amount detected from the captured image acquired in the normal control period; and calculate, in an abnormal control period being the control period in which the detection abnormality is determined to be present, the actual position on the basis of the weld characteristic amount detected from the captured image acquired in the normal control period previous to the abnormal control period.

For instance, when the input heat amount determined by the weld condition is too small, the captured image becomes too dark. On the other hand, when the input heat amount is too large, the captured image becomes too bright. As a result, it may be impossible to detect the weld characteristic amount appropriately, such as failure or error in detection of the weld characteristic amount in image processing.

With the above configuration (11), if the weld characteristic amount is not appropriately detected from the captured image, the actual position based on a captured image where no detection abnormality is determined to be present is used, by calculating the actual position by alternatively using the weld characteristic amount (alternative characteristic amount) detected from the captured image acquired in the immediately before normal control period, for instance. In this way, it is possible to continue welding. Furthermore, it is possible to prevent welding from being controlled on the basis of a weld characteristic amount with a detection abnormality, and thus it is possible to prevent damage to the weld target and the welding execution device and improve the reliability of the welding control device.

(12) In some embodiments, in the above configuration (11), the weld characteristic amount detection part is configured to detect the weld characteristic amount from a plurality of captured images acquired in the respective control periods, and the detection abnormality determination part is configured to determine that the detection abnormality is present if the weld characteristic amount is not detected from the plurality of captured images acquired in the respective control periods.

With the above configuration (12), a plurality of captured images are acquired in each control period. The entire position control is performed including detection of the weld characteristic amount and determination of the detection abnormality, on the basis of the plurality of captured images. In this way, it is possible to reduce the process load of processing the position control for each captured image individually, while appropriately performing the position control of the position control target.

(13) In some embodiments, in the above configuration (12), the actual position determination part is configured to: not determine, in the abnormal control period, the actual position in the abnormal control period if the normal control period does not exist within a period previous to the abnormal control period by a predetermined period of time determined in accordance with the weld characteristic amount.

With the above configuration (13), by not determining the actual position in the above case, it is possible to improve the reliability of welding while continuing welding as long as possible, as described below.

(14) In some embodiments, in any one of the above configurations (11) to (13), the detection abnormality determination part is configured to notify when a period after the abnormal control period and before the next first normal control period is longer than a predetermined period of time determined in accordance with the weld characteristic amount.

With the above configuration (14), if the abnormality detection of the weld characteristic amount from the captured image continues longer than the predetermined period of time, the detection abnormality determination part notifies necessity of determining whether it is possible to continue welding. While the weld characteristic amount changes with time, the above predetermined period of time is a period for which welding can be continued without any control even if the weld characteristic amount changes. After the elapse of the predetermined period of time, the notification is issued. In this way, it is possible to improve the reliability of welding while continuing welding as long as possible.

Furthermore, for instance, the electrode can be used in welding continuously without control for a relatively long potential lifetime because the shape of the groove (wall of the weld target) rarely makes an abrupt change. However, the weld wire is pulled out from a reel and used. Thus, the position of the weld wire may change abruptly, and is easily changeable from the position in the captured image taken immediately before detection of an abnormality. Thus, the potential lifetime of the weld wire for which welding can be continued without control is relatively short. Thus, in the above configuration (4), the above predetermined period of time is set for each weld characteristic amount. For instance, different periods of time will be set individually for the electrode position and the wire position. As described above, by determining the above predetermined period of time according to the weld characteristic amount, it is possible to continue welding suitable to the time of abnormality detection of various weld characteristic amounts included in the weld characteristic amount.

(15) In some embodiments, in the above configuration (14), the detection abnormality determination part is configured to send, to a welding execution device, an order to stop welding of the weld target.

With the above configuration (15), by stopping welding of the weld target, it is possible to improve the reliability of welding while continuing welding as long as possible.

(16) In some embodiments, in any one of the above configurations (1) to (15), the welding control device further includes a target position correction part configured to correct the target position determined by the target position determination part if a trouble phenomenon of the welding is detected.

For instance, if droplets are formed when the tip of the weld wire is not in the molten pool, it is necessary to bring the tip of the weld wire to be in contact with the molten pool. Thus, it is necessary to move the weld wire downward in the captured image. Furthermore, in a case where butting occurs between the tip of the weld wire and the weld target at the bottom of the molten pool, it is necessary to move the tip of the weld wire upward in the captured image to prevent collision. When the position control of the position control target such as the weld wire at the time of detection of a welding trouble is to be performed separately from the position control of the position control target such as the weld wire for bringing the actual position to the target position, the directions of the two controls may be opposite, one control being directed downward and the other control being directed upward, for instance, which may cause control hunting.

With the above configuration (16), it is possible to avoid the above described hunting by correcting the target position on the basis of a welding trouble.

(17) In some embodiments, in any one of the above configurations (2) to (16), the weld characteristic amount includes the wire position and the molten pool position of the molten pool, and the position control target is composed of the weld wire.

With the above configuration (17), it is possible to control the welding execution device so as to bring the actual relative position of the wire position and the molten pool position to the target relative position.

(18) In some embodiments, in any one of the above configurations (1) to (17), the weld condition includes at least one condition of an electrode current, an electrode voltage, a welding rate, a feeding amount of the weld wire per unit time, or a groove width.

With the above configuration (18), it is possible to determine an actual position corresponding to the weld condition including the above described one condition.

(19) In some embodiments, in any one of the above configurations (1) to (18), the weld condition comprises a plurality of weld conditions, and the target position determination part is configured to determine the target position corresponding to the weld condition including an aggregated condition aggregating at least two of the plurality of weld conditions.

With the above configuration (19), the number of conditions (dimension) included in the weld condition C that serves as an input is reduced (dimension is reduced) by aggregating at least two of the conditions included in the weld condition such as the electrode current, the electrode voltage, the welding rate, the feed amount of the weld wire per unit time, and the groove width. Accordingly, in a case where the above described target value conversion unit is generated as a table, for instance, it is possible to reduce the dimension by aggregating combinations of the inputted weld conditions into another element such as the heat input amount, which makes it possible to address the case with fewer tables.

(20) According to at least one embodiment of the present invention, a method of controlling welding configured to control a position control target including at least one of a weld wire used in welding of a weld target or an electrode for melting the weld wire includes: a step of determining an actual position of the position control target on the basis of a weld characteristic amount detected from a captured image captured so as to include at least the position control target, the weld characteristic amount including at least one of a wire position of the weld wire or an electrode position of the electrode; a step of determining a target position being a target of the actual position corresponding to a weld condition for welding the weld target; and a step of executing a position control of the position control target to bring the actual position to the target position.

With the above configuration (20), it is possible to achieve the same advantageous effect as that of the above (1).

(21) In some embodiments, in the above configuration (20), the captured image further includes at least one of a groove of the weld target or a molten pool formed on the groove by melting of the weld wire, the weld characteristic amount further includes at least one of a groove position of the groove or a molten pool position of the molten pool, the actual position includes an actual relative position being a relative position of at least one of the wire position or the electrode position with respect to the groove position or the molten pool position, and the target position includes a target relative position being a target of the relative position corresponding to the weld condition for welding the weld target.

With the above configuration (21), it is possible to achieve the same advantageous effect as that of the above (2).

(22) In some embodiments, in any one of the above configurations (20) to (21), the step of determining the target position includes: a step of acquiring the weld condition; and a step of determining the target position corresponding to the weld condition on the basis of a relationship between a previous weld condition at the time of a previous welding and a previous position being the actual position set under the previous weld condition.

With the above configuration (22), it is possible to achieve the same advantageous effect as that of the above (3).

(23) In some embodiments, in the above configuration (21), the step of determining the target relative position includes: a step of determining the target relative position corresponding to the weld condition from the weld characteristic amount, on the basis of a relationship between a previous weld characteristic amount at the time of a previous welding performed under a previous weld condition at the time of the previous welding and a previous relative position being a relative position of the previous weld characteristic amount.

With the above configuration (23), it is possible to achieve the same advantageous effect as that of the above (5).

(24) According to at least one embodiment of the present invention, the welding control program configured to control a position control target including at least one of a weld wire used in welding of a weld target or an electrode for melting the weld wire, is configured to permit a computer to implement: an actual position determination part configured to determine an actual position of the position control target on the basis of a weld characteristic amount detected from a captured image captured so as to include at least the position control target, the welding characteristic amount including at least one of a wire position of the weld wire or an electrode position of the electrode; a target position determination part configured to determine a target position being a target of the actual position corresponding to a weld condition for welding the weld target; and a position control part configured to execute a position control of the position control target to bring the actual position to the target position.

With the above configuration (24), it is possible to achieve the same advantageous effect as that of the above (1).

(25) In some embodiments, in the above configuration (24), the captured image further includes at least one of a groove of the weld target or a molten pool formed on the groove by melting of the weld wire, the weld characteristic amount further includes at least one of a groove position of the groove or a molten pool position of the molten pool, the actual position includes an actual relative position being a relative position of at least one of the wire position or the electrode position with respect to the groove position or the molten pool position, and the target position includes a target relative position being a target of the relative position corresponding to the weld condition for welding the weld target.

With the above configuration (25), it is possible to achieve the same advantageous effect as that of the above (2).

Advantageous Effects

According to at least one embodiment of the present invention, it is possible to provide a welding control device that controls a welding of a weld target in accordance with a weld condition.

DETAILED DESCRIPTION

Embodiments of the present invention will now be described in detail with reference to the accompanying drawings. It is intended, however, that unless particularly identified, dimensions, materials, shapes, relative positions and the like of components described in the embodiments shall be interpreted as illustrative only and not intended to limit the scope of the present invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
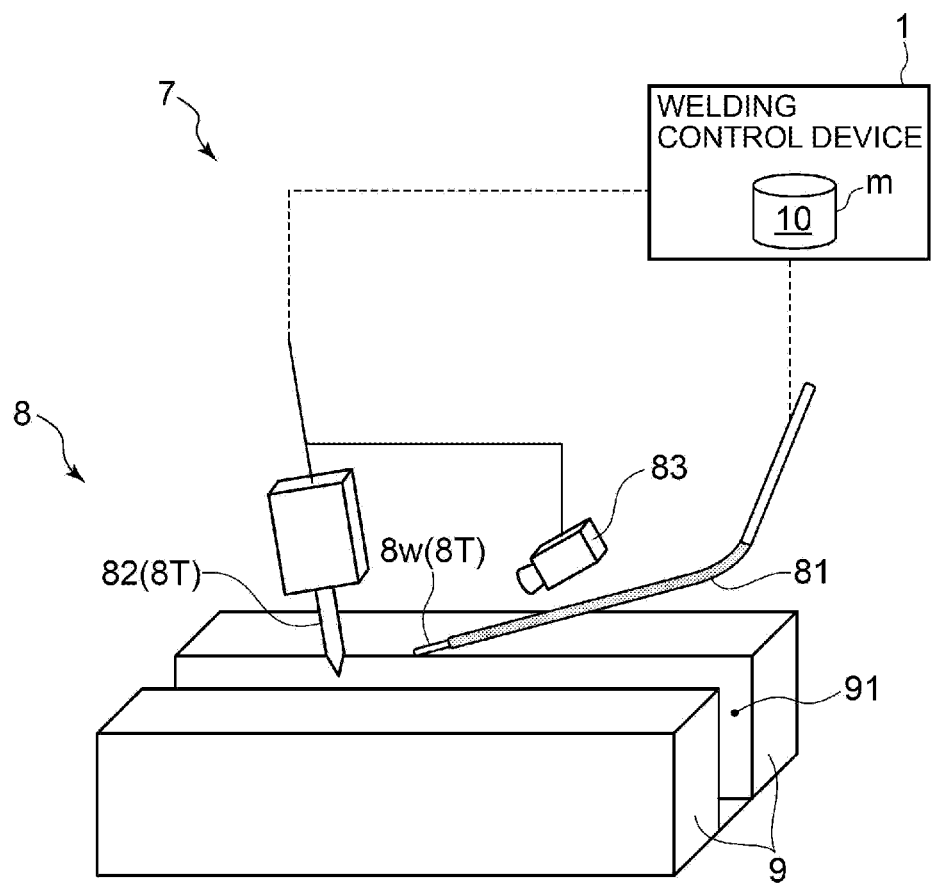
FIG. 1 is a perspective view of a configuration example of a welding device according to an embodiment of the present invention.
Figure 1:
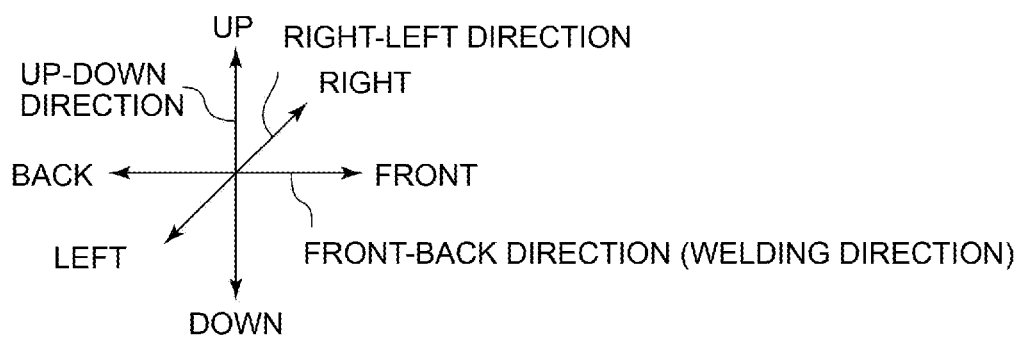
Figure 2:
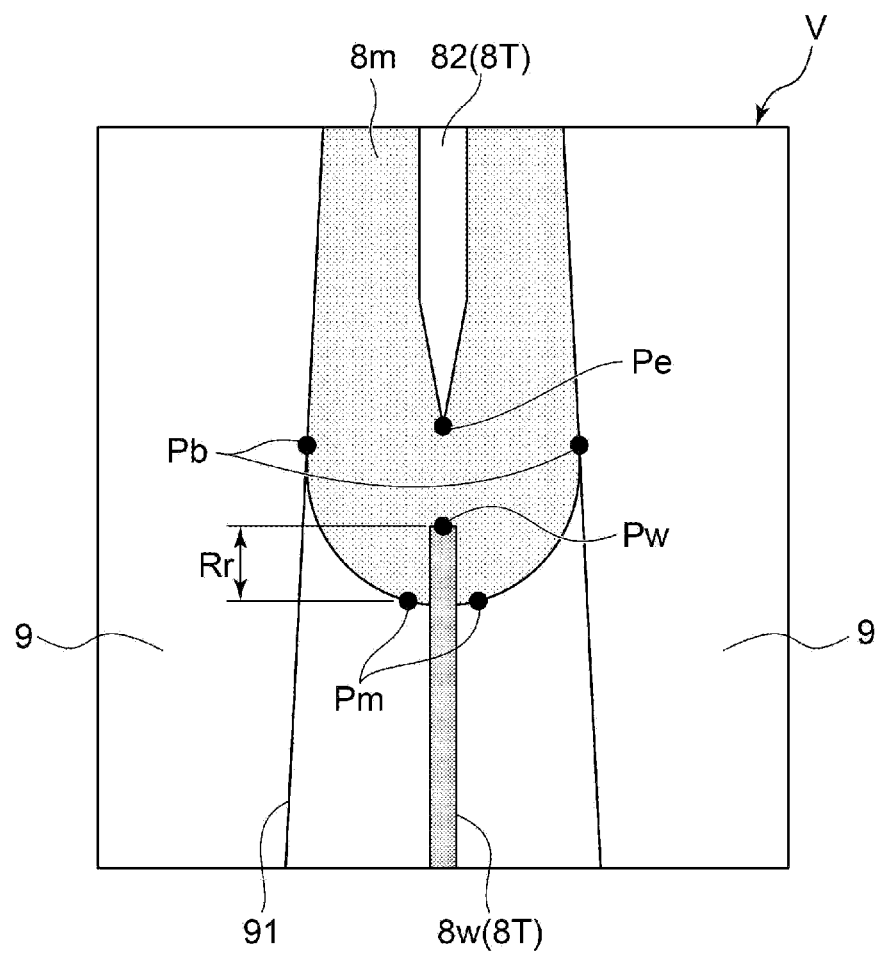
FIG. 2 is a diagram of a captured image according to an embodiment of the present invention.
Figure 2:
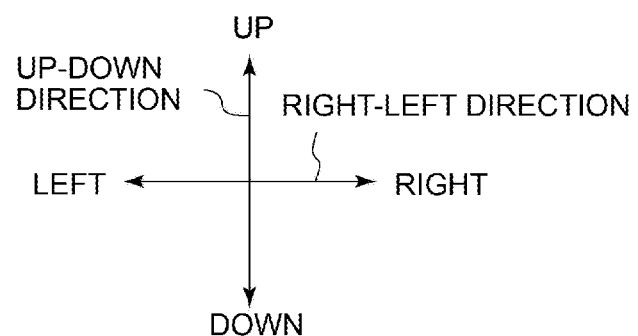

FIG. 1 is a perspective view of a configuration example of a welding device 7 according to an embodiment of the present invention. FIG. 2 is a diagram of a captured image V according to an embodiment of the present invention.

The welding device 7 is a device that automatically arc-welds a weld target such as a steel strip. As depicted in FIG. 1, the welding device 7 includes a welding control device 1 that controls a welding work and a welding execution device 8 that executes arc welding according to a control (command) from the welding control device 1.

Firstly, the welding execution device 8 constituting the welding device 7 will be described. The welding execution device 8 includes a wire feeder 81, an electrode 82, and a capturing part 83. The wire feeder 81 is a mechanism for feeding (supplying) a weld wire 8w sequentially to a weld part of a weld target 9. The weld wire 8w consumes through the course of a welding work. As the tip end of the weld wire 8w set on the wire feeder 81 is molten by arc discharge from the electrode 82, the weld wire 8w melts into a liquid-phase metal which cools and solidifies at the weld part of the weld target 9, whereby the weld target 9 is welded.

In the embodiment depicted in FIG. 1, the welding part of the weld target 9 is a gap extending horizontally between two components. The wire feeder 81 and the electrode 82 move relatively along the longitudinal direction of the gap of the weld target 9, and thereby a weld work is executed. More specifically, as the wire feeder 81 and the electrode 82 move relatively at a predetermined welding rate along the longitudinal direction of the gap of the weld target 9, a molten pool 8m is sequentially formed along the welding direction (longitudinal direction of the gap), from liquid-phase metal generated from melting of the weld wire 8w (see FIG. 2). Further, as the molten pool 8m cools and solidifies, the weld target 9 is welded.

In the following description, the front-back direction of the welding direction is referred to as the front-back direction, the width direction of the gap of the weld target 9 (direction orthogonal to the longitudinal direction) is referred to as the right-left direction, and the direction orthogonal to the front-back direction and the right-left direction is referred to as the top-down direction (vertical direction in FIG. 1). Further, in an actual welding work, the tip end of the weld wire 8w and the electrode 82 are more closely positioned to each other than depicted in FIG. 1. For instance, at least part of a member supporting the electrode 82 including the electrode 82 is positioned directly above the weld wire 8w.

Furthermore, the capturing part 83 is a capturing device that captures videos or images, such as a camera, installed so as to capture the weld part. A captured image V of the weld part captured by the capturing part 83 (hereinafter, merely referred to as 'captured image V') is used to detect the positions of capture targets including at least two of the above described weld wire 8w, the molten pool 8m, the electrode 82, or the groove 91 being a wall surface that forms the gap of the weld target 9. In the embodiment depicted in FIG. 1, the capturing part 83 is installed at such a position that the weld part can be viewed from diagonally above, in order to capture an image of the above capture targets at once. For instance, in the embodiment depicted in FIG. 1, the capturing part 83 is configured to capture the weld part such that the captured image V includes the weld wire 8w, the electrode 82, the molten pool 8m, and the groove 91.

In a welding work of the weld target 9 using the welding execution device 8 having the above configuration, the welding execution device 8 and the weld target 9 move relatively as described above, and the position of the groove 91 in the captured image V installed on the welding execution device 8 changes depending on the shape of the weld target 9. Similarly, the weld wire 8w is pulled out from a reel and fed to the weld part by the wire feeder 81, and the position of the weld wire 8w in the captured image V also changes due to the bending of the weld wire 8w, for instance. Thus, the welding execution device 8 includes a mechanism for moving (adjusting) the position of the weld wire 8w or the electrode 82.

In the embodiment depicted in FIG. 1, the weld wire 8w and the electrode 82 are each capable of being moved in each of the front-back direction and the right-left direction in the captured image V. As depicted in FIG. 1, the welding execution device 8 is configured to regard the above described weld wire 8w and the electrode 82 as position control targets 8T, and move the positions of the position control targets 8T in accordance with an order of from the welding control device 1.

Hereinafter, the welding control device 1 will be described with reference to FIGS. 3A and 3B.

Figure 3A:
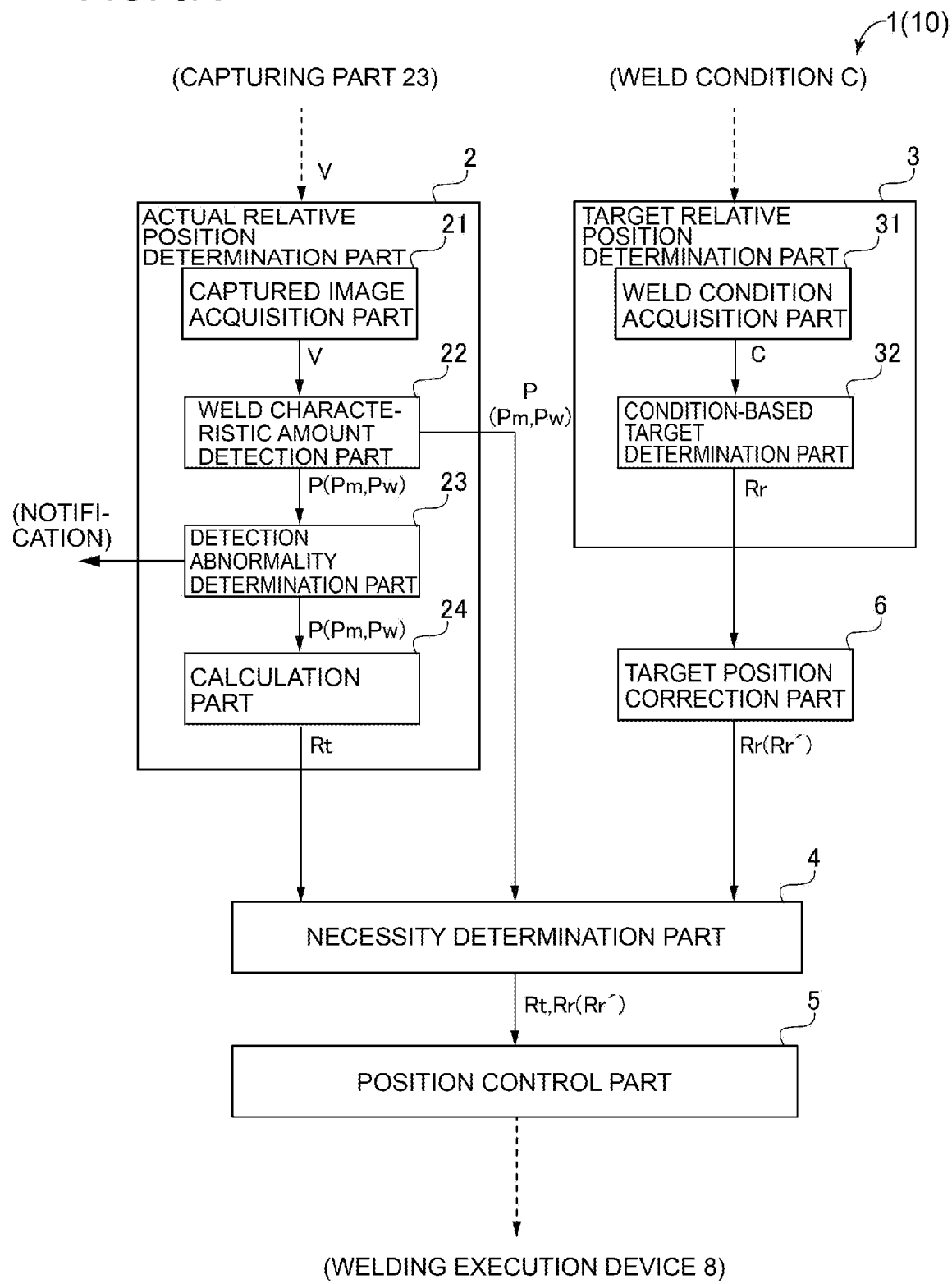
FIG. 3A is a functional block diagram of a welding control device according to an embodiment of the present invention, which determines the target relative position in response to a weld condition being an input.

FIG. 3A is a functional block diagram of a welding control device 1 according to an embodiment of the present invention, which determines the target relative position Rt in response to a weld condition C being an input. FIG. 3B is a functional block diagram of a welding control device 1 according to an embodiment of the present invention, which determines the target relative position Rt in response to a molten pool position Pm and a wire position Pw being inputs.

The welding control device 1 is a device configured to control the position of the position control target 8T including at least one of the weld wire 8w used in welding of the weld target 9, or the electrode 82 for melting the weld wire 8w. The welding control device 1 includes: an actual position determination part configured to determine (obtain) an actual position of the position control target 8T on the basis of a weld characteristic amount P detected from a captured image V captured so as to include at least the position control target 8T, the welding characteristic amount P including at least one of a wire position Pw of the weld wire 8w or an electrode position Pe of the electrode 82; a target position determination part configured to determine a target position being a target of the actual position corresponding to a weld condition C for welding the weld target 9; and a position control part configured to execute a position control of the position control target 8T to bring the actual position to the target position.

The actual position of the above position control target 8T is an actual position detected from the captured image V, and may be a position in a coordinate system set on the captured image V (absolute position), or a relative position (actual relative position Rr) of the wire position Pw or the electrode position Pe being the position of the position control target 8T with respect to another weld characteristic amount P (molten pool position Pm or groove position Pb described below). In a case where the position of the weld characteristic amount P is an absolute position, the camera or the like for capturing the captured image V is placed in a fixed state, and the control is performed to bring the absolute position of the wire position Pw or the like to a target position which is the center position in the right-left direction (described below) of the captured image V, for instance. Alternatively, a function capable of calculating the target absolute position corresponding to the above target position from an absolute position or another weld characteristic amount P may be prepared in advance, and the function may be used to obtain a target absolute position from the weld characteristic amount P. More specifically, for instance, the target absolute position is obtained by using a non-linear function or a table from the position in the right-left direction (described below) of the electrode position Pe and the groove position Pb.

Hereinafter, the above described functional parts of the welding control device 1 will be described using the embodiments depicted in FIGS. 3A and 3B as examples, where the position of the weld characteristic amount P is a relative position. As depicted in FIGS. 3A and 3B, the welding control device 1 includes an actual relative position determination part 2, a target relative position determination part 3, and a position control part 5. For an embodiment where the actual position of the position control target 8T is an absolute position, the actual relative position Rr in the following description may be replaced with an absolute position, and the target relative position Rt may be replaced with a target absolute position.

The welding control device 1 includes a computer, for instance, including a CPU (processor, not depicted) and a storage device M such as an exterior storage device and memories like ROM and RAM. The CPU operates (e.g. computation of data) in accordance with instructions of a program (welding control program 10) loaded to a memory (main storage device), and thereby the above functional parts of the welding control device 1 are implemented. In other words, the welding control program 10 is a software for permitting the computer to implement the respective functional parts described below, and may be stored in a storage medium that is readable by a computer.

The actual relative position determination part 2 determines the actual relative position Rr being the relative position of two of weld characteristic amounts P detected from the above described captured image V, the weld characteristic amounts P including at least two of the groove position Pb of the groove 91, the wire position Pw of the weld wire 8w, the molten pool position Pm of the molten pool 8m, or the electrode position Pe of the electrode 82. The captured image V is captured so as to include the position control target 8T and at least one of the groove 91 of the weld target 9 or the molten pool 8m formed on the groove 91 by melting of the weld wire 8w. More specifically, in a case where the position control target 8T is the weld wire 8w, the captured image V includes at least the wire position Pw part of the weld wire 8w, and at least the molten pool position Pm part of the molten pool 8m or at least the groove position Pb part of the groove 91. In a case where the position control target 8T is the electrode 82, the captured image V includes at least the electrode position Pe part of the electrode 82, and at least the groove position Pb part of the groove 91.

Furthermore, the above wire position Pw is a position of a desired position of the weld wire 8w. The molten pool position Pm is the position of a desired portion of the molten pool 8m. The groove position Pb is the position of a desired portion of the groove 91. The electrode position Pe is the position of a desired portion of the electrode 82. In the embodiments depicted in FIGS. 1 to 3B, as depicted in FIG. 2, the wire position Pw is a position of the tip portion of the weld wire 8w positioned at the rearmost (bottom in the top-down direction) of the captured image V. The molten pool position Pm is a position of the tip portion of the molten pool 8m positioned at the frontmost in the captured image V. The groove position Pb is a position of a predetermined part determined as the relative position to the electrode 82. Furthermore, the electrode position Pe is a tip portion of the electrode 82 positioned at the rearmost (bottom in the top-down direction) of the captured image V. Furthermore, in the embodiment depicted in FIGS. 1 to 3B, the weld characteristic amount P includes at least the wire position Pw and the molten pool position Pm.

More specifically, the actual relative position determination part 2 detects the weld characteristic amount P through image-processing of the captured image V, and calculates the actual relative position Rr on the basis of the detection result. For instance, in a case where the position control target 8T is the weld wire 8w, the wire position Pw and the molten pool position Pm are detected to perform a position control on the weld wire 8w in the top-down direction. Alternatively, the wire position Pw and the groove position Pb are detected to perform a position control on the weld wire 8w in the right-left direction. On the other hand, in a case where the position control target 8T is the electrode 82, the electrode position Pe and the groove position Pb are detected to perform a position control on the electrode 82 in the right-left direction. The actual relative position Rr may be a distance along the direction of controlling the control target. Alternatively, the actual relative position Rr may be the position (coordinate) with reference to a position such as the left-bottom end of the captured image V or another position (coordinate) with reference to one of the two weld characteristic amounts P constituting the actual relative position Rr.

Figure 3B:
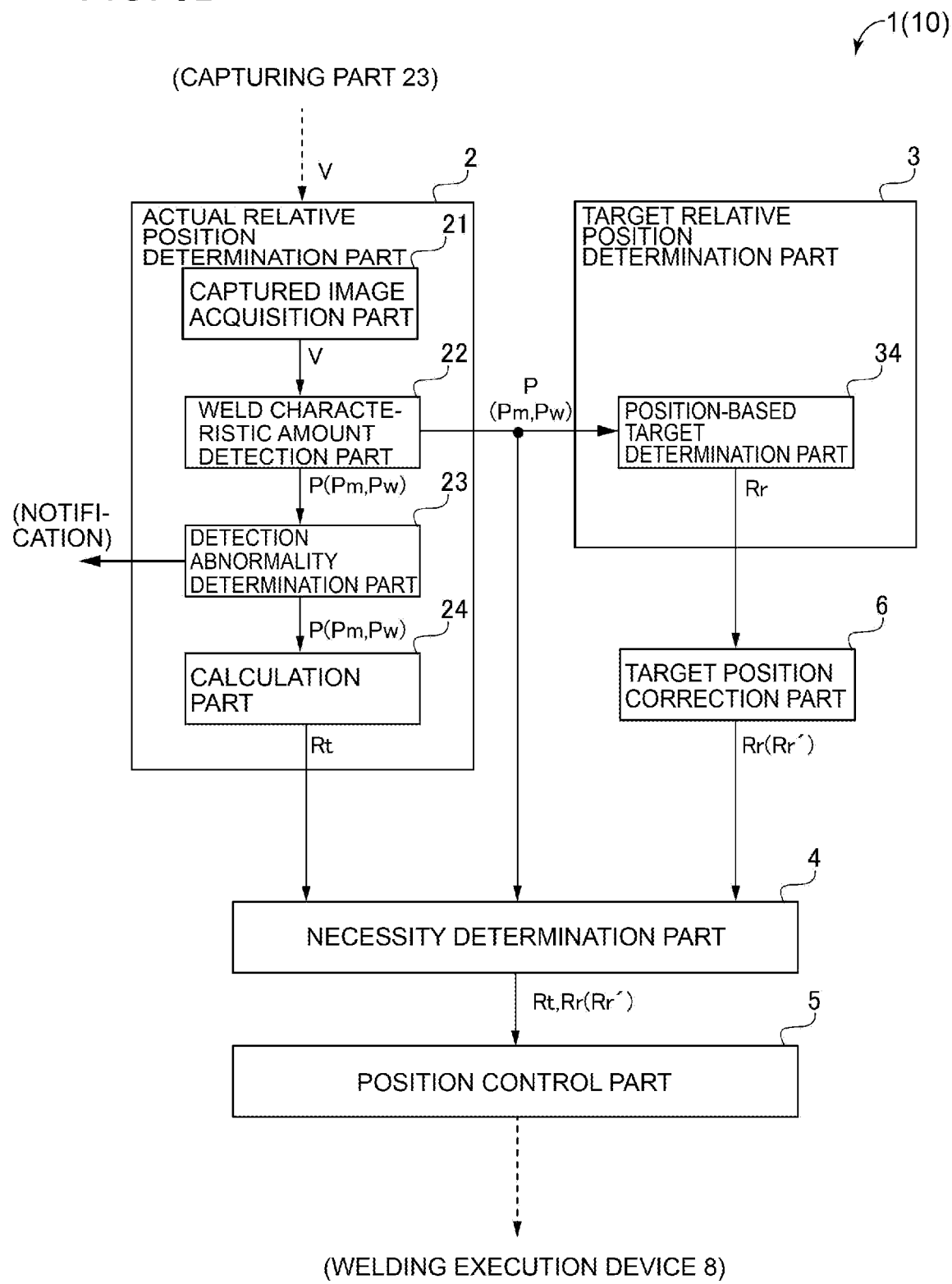
FIG. 3B is a functional block diagram of a welding control device according to an embodiment of the present invention, which determines the target relative position in response to a molten pool position and a wire position being inputs.

In the embodiment depicted in FIGS. 1 to 3B, the position control target 8T is at least the weld wire 8w, and the weld characteristic amount P includes the wire position Pw and the molten pool position Pm. Furthermore, as depicted in FIGS. 3A and 3B, the actual relative position determination part 2 includes a captured image acquisition part 21 configured to acquire a captured image V from a capturing part 83 that captures an image of the weld part at the time of welding, a weld characteristic amount detection part 22 configured to detect the weld characteristic amount P including the wire position Pw and the molten pool position Pm from the captured image(s) V acquired by the captured image acquisition part 21 for each of a predetermined control period T, and a calculation part 24 configured to calculate the actual relative position Rr (wire-pool relative position) on the basis of the weld characteristic amount P including the detected wire position Pw and molten pool position Pm.

More specifically, the captured image acquisition part 21 is connected to the capturing part 83, and thereby the captured image V is inputted real-time. Furthermore, the weld characteristic amount detection part 22 is connected to the captured image acquisition part 21, and thereby the captured image V acquired by the captured image acquisition part 21 is inputted real-time. The captured image acquisition part 21 may store all of the inputted captured images V in the storage device 'm', or may select a part of the inputted captured images V at predetermined intervals, for instance, and store the selected captured images V in the storage device 'm'. The captured image V stored by the captured image acquisition part 21 is inputted to the weld characteristic amount detection part 22. Furthermore, the weld characteristic amount detection part 22 is configured to detect the weld characteristic amount P in each of a predetermined control period T. The calculation part 24 is connected to the weld characteristic amount detection part 22, and thereby the weld characteristic amount P is inputted real-time. Accordingly, it is possible to calculate the actual relative position Rr real-time through real-time image processing of the captured images V at the time of welding.

The target relative position determination part 3 determines the target relative position Rr being the target of the above relative position (actual relative position Rr such as the wire-pool relative position) corresponding to the weld condition C at the time of welding of the weld target 9. The weld condition C is a condition that affects the welding state of the weld target 9 by the welding execution device 8. For instance, the weld condition C may include at least one condition of an electrode current or an electrode voltage of the electrode 82, a welding rate that is a rate of relative movement between the welding execution device 8 and the weld target 9 (arc movement rate), a feed amount of the weld wire 8w (feed amount per unit time), or a groove width of the groove 91.

While the weld state changes depending on the heat input condition at the time of welding, the weld condition C sets the heat input condition. Specifically, as the electrode current or the electrode voltage increases, the heat input amount increases. As the welding rate increases, the weld part to be weld per time increases, and thus the heat input amount per unit amount of the size of the weld part decreases. As the feed amount of the weld wire 8w increases, the heat input amount per unit amount of the weld wire 8w decreases. Furthermore, as the groove width increases, the molten pool 8m widens in the right-left direction or the like, and the heat input amount per unit volume decreases.

Furthermore, the target relative position Rt needs to be comparable to the above described actual relative position Rr. For instance, the target relative position Rt may be a distance along the direction of control of the control target, or a position of one of the two weld characteristic amounts P constituting the actual relative position Rr with respect to the other one of the two weld characteristic amounts P. How to determine the target relative position Rt will be described below. The target relative position Rt may be determined by applying machine learning.

The position control part 5 performs a position control on the weld target to bring the actual relative position Rr determined by the above described actual relative position determination part 2 to the target relative position Rt determined by the above described target relative position determination part 3. In other words, the position control of the weld target includes calculating the control amount of the weld target required to bring the difference (amount of misalignment) between the actual relative position Rr and the target relative position Rt within a predetermined range including zero, and sending the calculated control amount to the welding execution device 8. Further, the welding execution device 8 controls the position of the weld target in accordance with the received control amount.

More specifically, the control amount may be the movement amount from the current position to the destination, or the coordinate of destination of the weld target in a coordinate system for the welding execution device 8 to recognize position. Furthermore, the position control part 5 may control the position of the weld target while detecting the position after movement in response to the sent control amount through image processing of the captured image V (feedback control).

In the above described embodiments, the relative position of the wire position Pw and the molten pool position Pm along the front-back direction (wire-pool relative position) is described as an example. Nevertheless, the present invention is not limited to the present embodiment. A position control corresponding to the weld condition C similar to the above described control may be performed on the relative position of the wire position Pw and the molten pool position Pm along the right-left direction. Furthermore, similar to the above description, in some other embodiments, at least one of the electrode 82 or the wire position Pw may be controlled in the front-back direction so as to bring the actual relative position of the electrode position Pe and the wire position Pw to the target relative position, by detecting the electrode position Pe of the electrode 82 and the wire position Pw from the captured image V and calculating the target relative position of the electrode position Pe and the wire position Pw on the basis of the weld condition C. In some other embodiments, the electrode position Pe may be controlled in the right-left direction so as to bring the actual relative position of the electrode position Pe and the groove position Pb of the groove 91 to the target relative position, by detecting the electrode position Pe and the groove position Pb from the captured image V and calculating the target relative position of the electrode position Pe and the groove position Pb on the basis of the weld condition C. As depicted in FIG. 2, the electrode position Pe may be a tip portion of the electrode 82 positioned frontmost in the front-back direction, and the groove position Pb may be the position of a predetermined portion determined by the relative position with respect to the electrode 82.

With the above configuration, according to the weld condition C, the target of two relative positions (target relative position Rt) included in the weld characteristic amount, such as the relative position of the position of the weld wire 8w and the molten pool 8m, for instance, is determined. Furthermore, the welding execution device 8 is controlled so as to bring the actual relative position (actual relative position Rr) obtained through image processing of the captured images V of the weld state by the welding execution device 8 to the target. Accordingly, it is possible to automatically carry out arc welding at a welding quality similar to that by a welder, and it is possible to realize automatic welding with reduced dependency on the welder's skill.

Next, some other embodiments related to determination of the target relative position Rt will be described. Hereinafter, for more specific description, the actual relative position Rr and the target relative position Rt are described as relative positions of the wire position Pw and the molten pool position Pm. However, the present invention is not limited to this example. The relative position may be a relative position of any two of the above described weld characteristic amounts P (wire position Pw, molten pool position Pm, electrode Pe, groove position Pb), and the wire position Pw and the molten pool position Pm in the following description may be replaced with desired two positions.

In some embodiments, as depicted in FIG. 3A, the above described target relative position determination part 3 includes a weld condition acquisition part 31 configured to acquire the weld condition C at the time of executing welding on the weld target 9, and a condition-based target determination part 32 configured to determine the target relative position Rt corresponding to the weld condition C from the weld condition C acquired by the weld condition acquisition part 31, on the basis of a relationship between a weld condition at the time of a previous welding (previous weld condition) and a previous relative position being any two relative positions of the above described weld characteristic amounts P, such as the relative positions of the previous molten pool position and the previous wire position set under the previous weld condition. That is, records are information on how a welder has set the wire position Pw with respect to the molten pool position Pm in a previous welding work, and information of the content of the weld condition C in the previous welding work are associated and accumulate, and the accumulation of records are learned as learning data (machine learning) to derive the above relationship.

More specifically, the condition-based target determination part obtains, a plurality of times at different times, an information set of the weld condition C and a previous relative position calculated on the basis of weld characteristic amounts P such as the molten pool position Pm and the wire position Pw at the same timing, for weld works whose time, place, or the weld target 9 for determining the target relative position corresponding to the weld condition are different, by using a learning model (condition-based learning model) obtained through machine learning of a plurality of sets of data in which the previous weld condition is associated to the previous relative position set under the previous weld condition. Accordingly, a plurality of sets of data of the weld condition C and associated previous relative positions at respective timings is obtained, and used as learning data. To learn the learning data, a known technique may be applied, such as neural network and regression analysis. The learning model or regression expression obtained as described above (hereinafter, learning model) is a derived relationship between the weld condition C of welding by a welder and previous relative positions. Thus, by using the learning model, it is possible to obtain the target relative position Rt such as the wire-pool relative position that would be set by a welder. Therefore, the target relative position determination part 3 is capable of determining the target relative position Rt corresponding to the obtained weld condition C by using the learning model.

At this time, in a case where the weld condition C includes a plurality of conditions, at least two of the conditions can be aggregated into one condition, so as to reduce the number (dimension) of conditions included in the weld condition C that serves as an input. In this case, the weld condition C includes an aggregated condition aggregating at least two conditions of the weld condition C, and other conditions. Thus, the target relative position determination part 3 determines the target relative position Rt corresponding to the weld condition C that includes such an aggregated condition. For instance, the learning data may include a relationship between the previous relative position and a weld condition C that includes one aggregated condition, heat input amount, obtained by aggregating three conditions: the welding rate, the welding current, and the welding voltage. In this case, the learning model includes one condition, heat input amount, instead of three conditions: the welding rate, the welding current, and the welding voltage. The heat input amount is a heat amount supplied to the weld part from outside, and can be expressed by the following relationship expression: heat input={60×welding current×welding voltage}/welding rate. However, the present invention is not limited to the present embodiment. Depending on the situation, conditions that express the relationship with the target relative position Rt the best may be used. For instance, in some other embodiments, two conditions, the welding rate and the welding current, may be aggregated into one condition, the heat input amount.

In a case where the relationship between a plurality of weld conditions C and the target relative position Rt is expressed as a table in advance by using the learning model, when the weld condition C includes a plurality of conditions, the table needs to cover combinations of the plurality of conditions. The number of combinations increases with the number of conditions, as well as the cost of generating the table. By aggregating a plurality of conditions into a single condition and reducing the dimension as described above, it is possible to reduce the cost of generating the table.

Further, the weld condition C at the time of welding the weld target 9 may be obtained from the welding execution device 8 in the form of setting values set for the welding execution device 8, or may be inputted by an operator.

With the above configuration, learning (machine learning) includes learning accumulation of the corresponding relationship between a weld condition C in a previous welding and the record of two relative positions of weld characteristic amounts P such as the relative position of the weld wire 8w and the molten pool 8m obtained as a result of operation of the position control target 8T such as the weld wire 8w by a welder in the previous welding Also, on the basis of the result of the learning, the target relative position Rt is directly obtained from the weld condition C. As a result, it is possible to appropriately determine the target relative position Rt. Furthermore, by using the accordingly determined target relative position Rt for the position control, it is possible to realize a welding quality similar to that of a welder.

In some other embodiments, the target relative position determination part 3 includes a position-based target determination part 34 configured to determine the target relative position Rt corresponding to the weld condition C from the weld characteristic amount P such as the molten pool position Pm and the wire position Pw that serve as inputs, on the basis of a relationship between a previous characteristic amount such as the previous molten pool position and the previous wire position at the time of a previous welding performed under a previous weld condition (hereinafter, previous weld characteristic amount) and a previous relative position being a relative position of the previous weld characteristic amount. Similarly to the above description, information on how a welder has set the wire position Pw with respect to the molten pool position Pm in a previous welding work, and the relationship of the relative positions of both positions in the previous welding are associated and accumulated as a record, and this record is learned as learning data (machine learning) to derive the above relationship.

Herein, the heat input condition (heat input state) changes when the weld condition C changes, and thus the appropriate positions of the position control targets 8T such as the weld wire 8w and the electrode change in accordance with the weld condition C. A welder's operation includes recognizing the weld characteristic amount P (wire position Pw, molten pool position Pm, electrode position Pe, and groove position Pb) for ensuring the weld quality mainly from the visual information on the weld state that differs depending on the weld condition C, and operating the wire position Pw and the electrode 82 on the basis of their experience, thereby achieving high-quality welding. On the basis of the above findings, the present inventors considered it possible to obtain the target relative position Rt from a welder's operation history, instead of the weld condition C, since the operation should reflect the difference in the weld condition C.

More specifically, the target relative position determination part 3 determines the target relative position Rt corresponding to the weld condition C from the above weld characteristic amount P, by using the learning model obtained through machine learning of a plurality of sets of data in which the above described previous weld characteristic amount is associated with the above described previous relative position (position-based learning model). That is, for each of welding works whose time, place, and weld target 9 are different, the target relative position determination part 3 obtains, a plurality of times at different times, a set of information on weld characteristic amounts P such as the molten pool position Pm and the wire position Pw at the same timing. Accordingly, it is possible to obtain, at different timings, a plurality of sets of data where the molten pool position Pm, the wire position Pw, and the record of calculated values of the relative position of the molten pool position Pm and the wire position Pw are associated. The plurality of sets of data is used as learning data. To learn the learning data, a known technique may be applied, as described above. The learning model obtained by learning includes a derived relationship between the molten pool position Pm and the wire position Pw in welding by a welder, and the calculation result of the relative position of the molten pool position Pm and the wire position Pw. Thus, by using the learning model, it is possible to obtain the wire-pool relative position or the like that would be set by a welder, for a weld characteristic amount P that serves as an input. Therefore, the target relative position determination part 3 is capable of determining the target relative position Rt corresponding to the weld characteristic amount P by using the learning model.

With the above configuration, the relationship between the record of the weld characteristic amount P such as the position of the molten pool Pm and the position of the weld wire 8w obtained as a result of operation of the position control target 8T such as the weld wire 8w by a welder in a previous welding, and the record of the relative position obtained from the result is learned. Also, on the basis of the result of learning, the target relative position Rt is obtained from the weld characteristic amount P such as the position of the molten pool 8m and the position of the weld wire 8w. As a result, it is possible to appropriately determine the target relative position Rt. Further, it is possible to easily address non-experienced weld conditions C. For instance, when a trend can be determined from a big data (learning data), such as a linear relationship of the target relative position Rt of the weld wire 8w and the molten pool 8m, a non-experienced weld condition C close to a previously experienced condition or a non-experienced condition that interpolates a plurality of sets of data are within a range of linear modelization, and thus addressable. Furthermore, by using the accordingly determined target relative position Rt for the position control, it is possible to realize a welding quality similar to that by a welder.

In some other embodiments, the target relative position Rt corresponding to the weld condition C may be set in advance in a target-value conversion device such as a function or a table taking into account of the heat input condition or the like, and the target relative position determination part 3 may use the target-value conversion device to determine the target relative position Rt from the weld condition C. Specifically, the target relative position determination part 3 may determine the target relative position Rt from the weld condition C generated by using the above described condition-based learning model, by using the target-value conversion device for obtaining the target relative position Rt corresponding to the weld condition C. Alternatively, the target relative position determination part 3 may determine the target relative position Rt from weld characteristic amount P, by using the target-value conversion device for obtaining the target relative position Rt corresponding to the weld characteristic amount P, from the weld characteristic amount P generated by using the above described position-based learning model. Accordingly, it is possible to calculate the target relative position Rt corresponding to the weld condition C.

Figure 6:
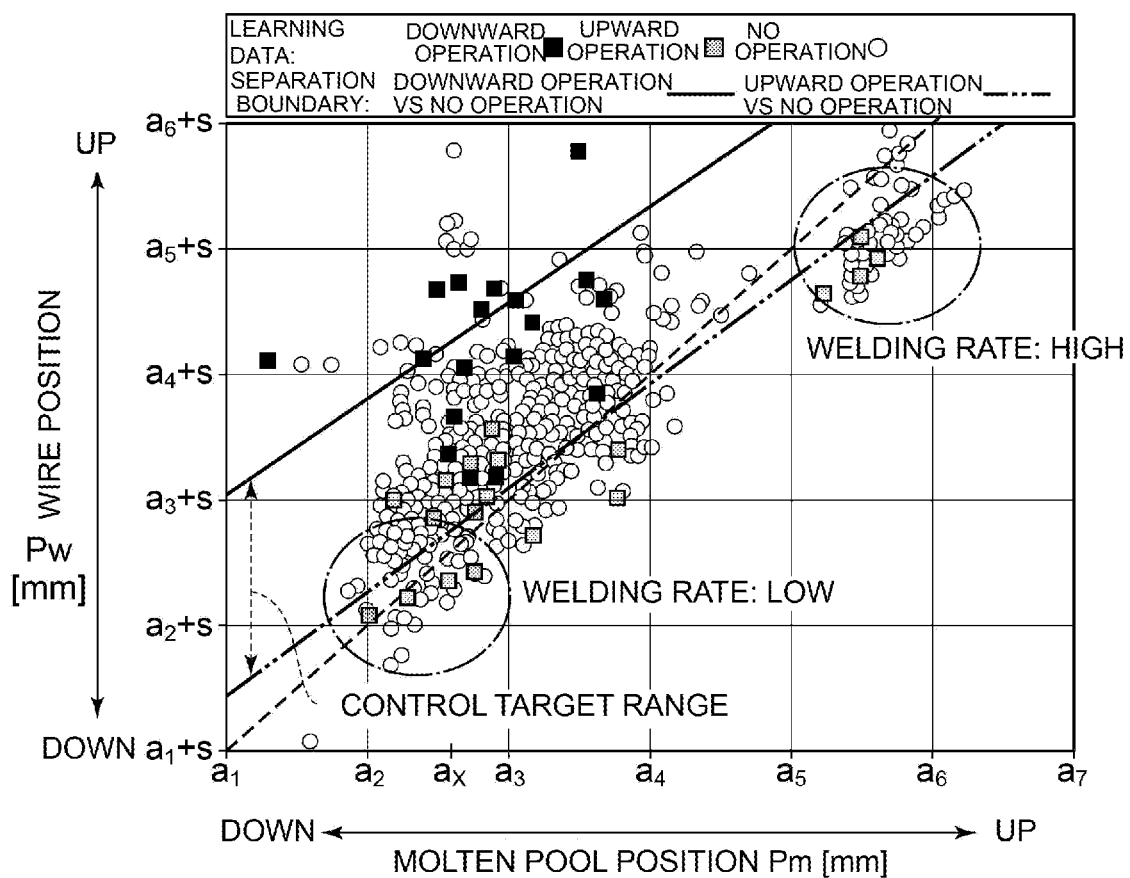
FIG. 6 is a graph showing the relationship between the molten pool position, the wire position, and the history of operation by a welder, according to an embodiment of the present invention.
Figure 7:
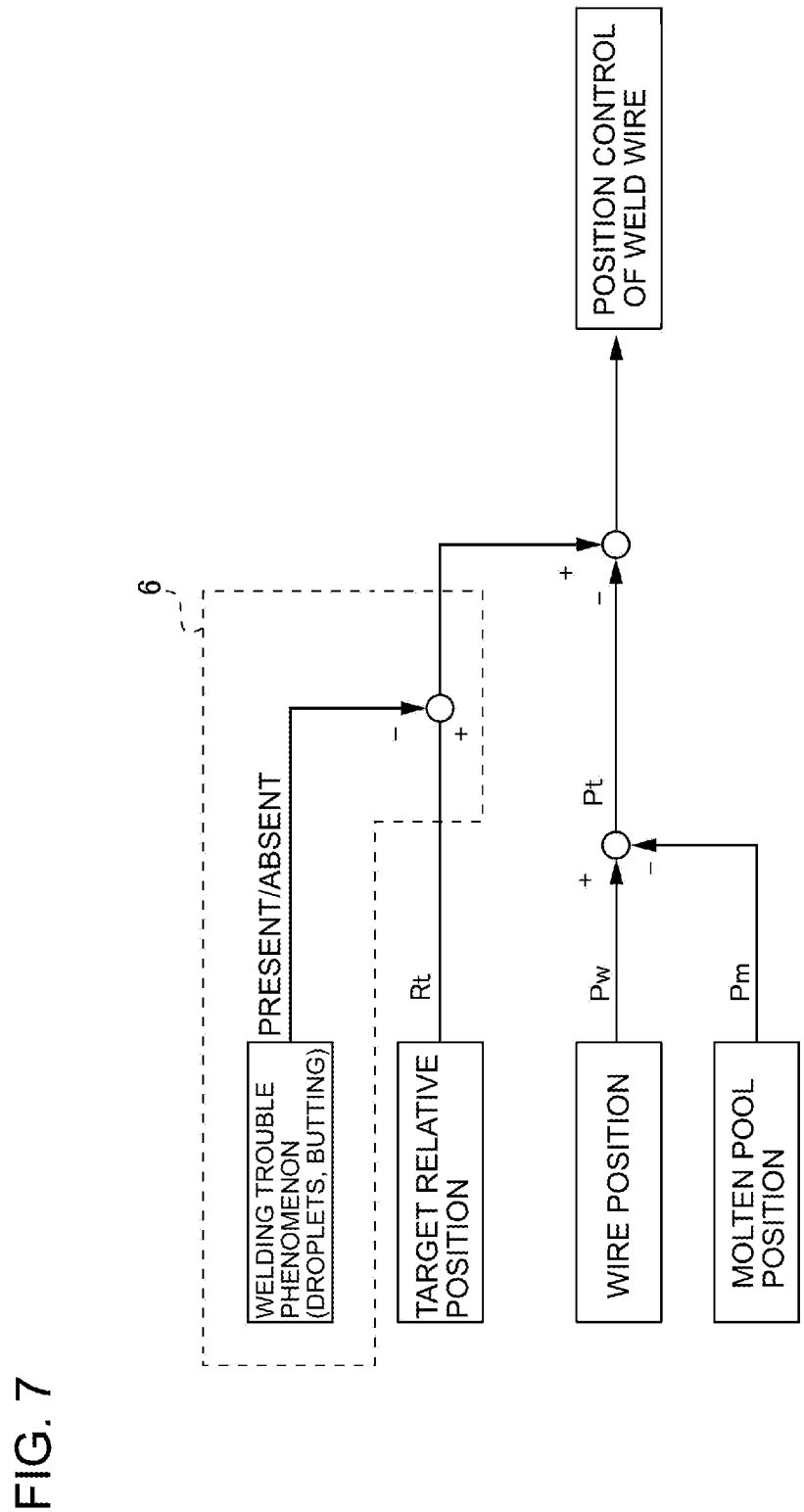
FIG. 7 is a diagram showing a logic on detection of a trouble phenomenon in welding, according to an embodiment of the present invention.

Next, some other embodiments of the welding control device 1 will be described with reference to FIGS. 6 and 7. FIG. 6 is a graph showing the relationship between the molten pool position Pm, the wire position Pw, and the history of operation by a welder, according to an embodiment of the present invention. FIG. 7 is a diagram showing the logic on detection of a trouble in welding, according to an embodiment of the present invention.

In some embodiments, the welding control device 1 may further include a position control necessity determination part 4 configured to determine a necessity of a position control of the position control target 8T on the basis of a difference between the target relative position Rt and the actual relative position Rr. In this case, the position control part 5 is configured to execute a position control of the position control target 8T such as the weld wire 8w on the basis of a determination result by the position control necessity determination part 4.

The graph in FIG. 6 will be described. The horizontal axis is the molten pool position Pm, and the vertical axis is the wire position Pw. The operation by a welder is plotted with respect to the molten pool position Pm and the wire position Pw. In other words, FIG. 6 shows how a welder operated for each combination of the molten pool position Pm and the wire position Pw. Specifically, the welder operated downward at the points plotted as solid squares (downward operation) and upward at the points plotted as light-shaded squares (upward operation). The welder carried out no operation at points plotted as the white hollow circles. Furthermore, the molten pool position Pm and the wire position Pw in the graph depicted in FIG. 6 are relative positions from the original point, which is the left bottom end of the captured image V (see FIG. 2). Nevertheless, the present invention is not limited to the present embodiment, and the original point of the coordinate may be any other position.

The value of the vertical axis in FIG. 6 is greater than the value of the horizontal axis by a constant S. The dashed line is a line connecting points at which the wire position Pw is greater than the molten pool position Pm by a constant S. As indicated by the dashed line, the molten pool position Pm and the wire position Pw differ depending on the welding rate. Furthermore, also regarding the wire-pool relative position (distance), when the welding rate is high, the wire positions Pw of the non-operation plot dots (hollow circles) concentrate below the dashed line, and the actual relative position Rr is shorter. In contrast, when the welding rate is low, the wire positions Pw of the non-operation plot dots (hollow circles) concentrate above the dashed line, and the actual relative position Rr is longer. Accordingly, the graph shows that the target relative position Rt is changed in accordance with the weld condition C.

As depicted in FIG. 6, while the wire position Pw has various values at a certain molten pool position Pm, such as when the molten pool position Pm is 'ax', the welder operates in some cases and does not operate in other cases. Furthermore, from FIG. 6, it can be seen that the welder does not operate in a certain range of the wire position Pw at the molten pool position Pm, and operates downward when the wire position Pw increases out of the range and upward when the wire position Pw decreases below the range. That is, according to analysis of operation by a welder, when the difference of the actual relative position Rr of the weld wire 8w and the molten pool 8m (|Pw−Pm|) is out of a predetermined range at the time of welding, the welder carries out operation to correct the difference, according to their experience.

Thus, when the position control necessity determination part 4 determines that the difference between the target relative position Rt and the actual relative position Rr is within a predetermined range, the position control is not performed on the weld wire 8w even if the target relative position Rt and the actual relative position Rr are not the same (a control dead zone is set). Accordingly, it is possible to complete welding with fewer operations with a quality similar to that by a welder.

In some embodiments, the above described predetermined range (hereinafter, referred to as "control dead zone" when appropriate) may be determined on the basis of a plurality of sets of operation history data in which previous weld characteristic amounts are associated with presence or absence of operation of the position control target 8T corresponding to the previous weld characteristic amounts, such as a plurality of sets of operation history data in which the previous molten pool position and the previous wire position at the time of previous welding are associated with presence or absence of operation of the previous wire position at the time of the previous welding. In this case, the position control necessity determination part 4 determines that it is necessary to perform a position control on the position control target 8T such as the weld wire 8w, if the difference between the above described actual relative position Rr and the target relative position Rt falls out of the control dead zone (predetermined range) determined as described above. In contrast, if the above difference is within the control dead zone, the position control necessity determination part 4 determines that the position control of the position control target 8T is not necessary.

More specifically, for instance, a support vector machine (SVM) generates a category model where a weld characteristic amount P is an input and an operation presence/absence label is an output, and a separation boundary plane is determined in the weld characteristic amount space to be focused on (in FIG. 6, the two-dimensional space of the molten pool position Pm and the wire position Pw), which separates the space where an operator's intervention operation is necessary (label: operation is present) and the space where the intervention operation is unnecessary (label: operation is absent). The accordingly obtained line is the solid line and two-dot chain line depicted in FIG. 6. The solid line is the separation boundary between downward operation-present and operation-absent. The space above the solid line is downward operation-present, and the space below is operation-absent. The two-dotted chain line is the separation boundary between upward operation-present and operation-absent. The space above the solid line is upward operation-present, and the space below is operation-absent. The space between the two separation boundaries is the control dead zone where operation is unnecessary.

In short, if the wire position Pw with respect to the molten pool position Pm is greater than the solid line in FIG. 6, downward operation is performed. If the wire position Pw with respect to the molten pool position Pm is smaller than the two-dotted chain line, upward operation is performed. If between the solid line and the two-dotted chain line, no operation is performed. In other words, the range between the solid line and the two-dotted chain line at each molten pool position Pm is the control dead zone, which serves as the control target range of the wire position Pw. Furthermore, the target relative position Rt calculated by the target relative position determination part 3 falls within the control target range.

In the embodiment depicted in FIGS. 3A and 3B, the position control necessity determination part 4 is connected to each of the actual relative position determination part 2 and the target relative position determination part 3. The actual relative position Rr and the target relative position Rt are inputted to the position control necessity determination part 4 from the actual relative position determination part 2. Furthermore, when the actual relative position Rr and the target relative position Rt are inputted, if the difference between the actual relative position Rr and the target relative position Rt is within the range of the control dead zone, the position control necessity determination part 4 does not perform the position control of the wire position Pw even if there is a difference between the target relative position Rt and the actual relative position Rr. In contrast, if the difference between the actual relative position Rr and the target relative position Rt falls out of the range of the control dead zone, the position control of the wire position Pw is performed so as to be in the range of the control dead zone.

Meanwhile, it is known that the identification performance of the SVM deteriorates considerably if the data of operation-present (e.g. down-operation present, upward operation present) is smaller than operation-absent and there is an unbalance in the number of data in the collected operation history data (learning data). Thus, to solve the unbalance of the number of data, in the embodiment depicted in FIG. 6, class weighting is performed on the basis of the data number ratio, so as to solve the problem of underestimation of the class of operation-present with smaller data.

With the above configuration, the range for determining the necessity of execution of the position control of the weld wire 8w is determined on the basis of the relationship between presence or absence of operation of the position of the weld wire 8w carried out by a welder, and the previous molten pool position and wire position. Accordingly, it is possible to appropriately set the above described predetermined range, and automatically complete welding with fewer operations with a quality similar to that by a welder.

In some of the above described embodiments, the predetermined range may be determined in accordance with the weld condition C. That is, the control dead zone for determining the necessity of execution of the position control of the weld wire 8w is variable depending on the weld condition C, or the weld characteristic amount P such as the molten pool position Pm and the wire position Pw that reflect the weld condition C. Accordingly, it is possible to set the above described predetermined range (range of the control dead zone) according to the weld condition C, and it is possible to appropriately address each of the weld condition C where it is necessary to perform a strict position control on the weld characteristic amount P such as the weld wire 8w and the weld condition C where it is not necessary.

In some other embodiments, the predetermined range may be constant regardless of the weld condition C.

Further, in some embodiments, as depicted in FIGS. 3A and 3B, the above described actual relative position determination part 2 may further include a detection abnormality determination part 23 that determines the detection abnormality of the weld characteristic amount P for each of the above described control period T detected by the weld characteristic amount detection part 22 (hereinafter, merely referred to as detection abnormality). More specifically, in a normal control period Ts being a control period T in which the detection abnormality is determined to be absent by the detection abnormality determination part 23, the actual relative position determination part 2 calculates the actual relative position Rr on the basis of the weld characteristic amount P detected from the captured image V obtained in the normal control period Ts.

On the other hand, in some embodiments, in an abnormal control period Tf being a control period T in which the detection abnormality is determined to be present by the detection abnormality determination part 23, the actual relative position determination part 2 may calculate the actual relative position Rr on the basis of the weld characteristic amount P detected from the captured image V obtained in a normal control period Ts that already ended before the abnormal control period Tf. That is, in the abnormal control period Tf, the actual relative position determination part 2 may use the actual relative position Rr obtained in the normal control period Ts previous to the abnormal control period Tf.

The above detection abnormality refers to when the weld characteristic amount P is an outlier, including a case where the weld characteristic amount P was not detected at all from the captured image V in each control period T through image processing by the weld characteristic amount detection part 22, a case where the value of the weld characteristic amount P makes a considerable change unexpectedly, or a case where the value of the weld characteristic amount P is an unreasonable value. For instance, when the input heat amount determined by the weld condition C is too small, the captured image V becomes too dark. On the other hand, when the input heat amount is too large, the captured image V becomes too bright. In such cases, it may be impossible to detect the weld characteristic amount P appropriately, including failure of detection of the weld characteristic amount P in image processing and wrong detection.

Further, in the present embodiment, in the abnormal control period Tf, the welding control is not immediately stopped, but the welding work is continued by using the actual relative position Rr obtained from the captured image V acquired in the normal control period Ts previous to the determination. This is because the detection abnormality of the weld characteristic amount P may be temporary due to the heat input amount in welding, and may recover by itself.

Specifically, in the abnormal control period Tf, the weld characteristic amount P detected from the captured image V acquired in a previous normal control period Ts may be inputted into the calculation part 24, or the actual relative position Rr from the captured image V acquired in a previous normal control period Ts may be outputted from the calculation part 24. In the embodiment depicted in FIGS. 3A and 3B, the detection abnormality determination part 23 determines presence or absence of detection abnormality on the basis of the value of the weld characteristic amount P or notification of failure of detection of the weld characteristic amount P inputted from the weld characteristic amount detection part 22. Furthermore, the detection abnormality determination part 23 outputs a weld characteristic amount P inputted from the weld characteristic amount detection part 22 to the calculation part 24 if the detection abnormality is determined to be absent.

Figure 4:
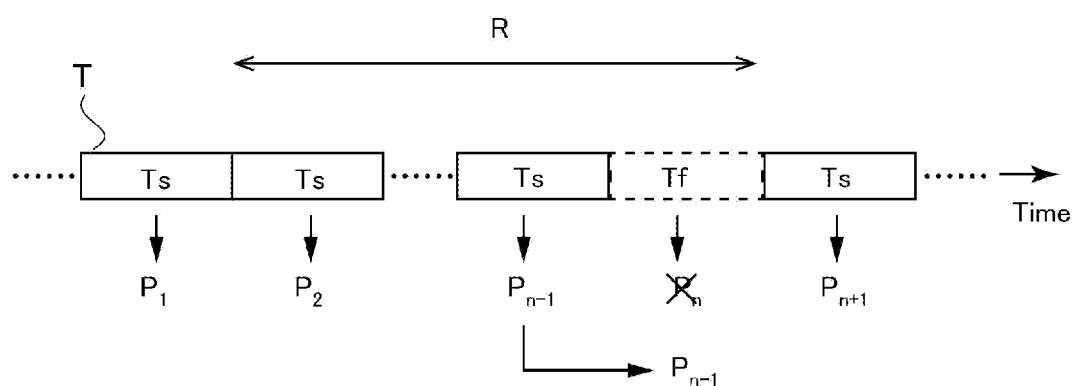
FIG. 4 is a diagram for describing the operation, in an abnormal control period, of an actual relative position determination part according to an embodiment of the present invention, where a normal control period exists before the abnormal control period by a predetermined period of time.

This point will be described with reference to FIG. 4. FIG. 4 is a diagram for describing the operation, in an abnormal control period Tf, of an actual relative position determination part 2 according to an embodiment of the present invention, where a normal control period Ts exists prior to the abnormal control period Tf by a predetermined period of time R. FIG. 4 shows repetition of the control period T with time, and how the weld characteristic amount P (P1, P2, ..., Pn−1, Pn+1 ... : n is an integer) is detected from the captured image V acquired in each control period T.

Further, in the embodiment depicted in FIG. 4, the control period T before and after the n-th period is the normal control period Ts, and the n-th period is the abnormal control period Tf. Thus, the actual relative position determination part 2 (weld characteristic amount detection part 22) cannot detect the weld characteristic amount P from the captured image V acquired in the n-th control period T (abnormal control period Tf). Thus, the actual relative position determination part 2 uses the weld characteristic amount P detected from the captured image V of the normal control period Ts prior to (before) the n-th abnormal control period Tf instead, as the weld characteristic amount P detected from the captured image V of the n-th abnormal control period Tf.

Further, for instance, the actual relative position determination part 2 may be configured to, in each abnormal control period Tf, if there is no normal control period Ts in the period before the abnormal control period Tf by a period of time R determined in accordance with the weld characteristic amount P, not determine the actual relative position Rr in the abnormal control period Tf. In other words, it may be notified if the period after the abnormal control period Tf and before the first next normal control period Ts exceeds a predetermined period of time R. Alternatively, the detection abnormality determination part 23 may issue a notification described below.

Furthermore, for instance in FIG. 4, in a case where the (n−1)th control period is an abnormal control period Tf, the weld characteristic amount P in the (n−2)th normal control period Ts may be used instead. Further, while the weld characteristic amount P in the (n−1)th (immediately before) normal control period Ts is used instead in FIG. 4, the alternative weld characteristic amount P may be taken from any normal control period Ts included in the above described predetermined period of time R.

In the embodiment depicted in FIGS. 1 to 3B, in a single cycle of the control period T in which the above described weld characteristic amount detection part 22 detects the weld characteristic amount P, the captured image acquisition part 21 acquires a plurality of captured images V, which are accumulated in the storage device 'm' or the like. Furthermore, the weld characteristic amount detection part 22 detects the weld characteristic amount P from a plurality of captured images V accumulated in each control period T, and determines that the above detection abnormality is present if no target weld characteristic amount P can be detected from the plurality of captured images V (no effective data). In this way, while appropriately performing the position control of the position control target 8T, the process load of process for the position control in each captured image is reduced. In the present embodiment, in a case where a plurality of values are detected from a plurality of captured images V in relation to one position of the wire position Pw or the like in the normal control period Ts, the value detected from the latest captured image V in a single cycle of the normal control period Ts from the captured images V detected with appropriate positions, for instance, which are considered most appropriate as a control standard, may be used as the weld characteristic amount P in future calculation of the actual relative position Rr.

However, the present invention is not limited to the embodiments depicted in FIGS. 1 to 3B. In some other embodiments, the captured image acquisition part 21 may acquire one captured image V in a single cycle of the control period T. In this case, the weld characteristic amount detection part 22 determines that the detection abnormality is present, if a target weld characteristic amount P cannot be detected from a single captured image V acquired in each control period T.

With the above configuration, if the weld characteristic amount P is not appropriately detected from the captured image V, the actual relative position Rr based on a captured image V where no detection abnormality is determined to be present may be used, by calculating the actual relative position Rr by alternatively using the weld characteristic amount P (alternative characteristic amount) detected from the captured image V acquired in the immediately-before normal control period Ts, for instance. In this way, it is possible to continue welding. Furthermore, it is possible to prevent welding from being controlled on the basis of a weld characteristic amount P with a detection abnormality, and thus it is possible to prevent damage to the weld target 9 or the welding execution device 8 and improve the reliability of the welding control device 1.

Furthermore, in some other embodiments, in the abnormal control period Tf, the actual relative position determination part 2 may not control the position control target 8T by not outputting the actual relative position Rr to the calculation part 24.

Figure 5:
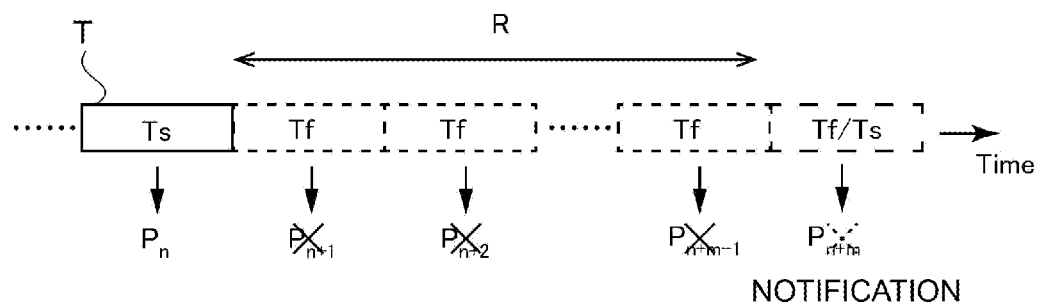
FIG. 5 is a diagram for describing the operation, in an abnormal control period, of an actual relative position determination part according to an embodiment of the present invention, where a normal control period does not exist before the abnormal control period by a predetermined period of time.

In some embodiments related to the above described detection abnormality, as depicted in FIGS. 3A and 3B, the above described detection abnormality determination part 23 notifies if the period after the abnormal control period Tf and before the first next normal control period Ts exceeds a predetermined period of time R determined in accordance with the position control target 8T like the weld wire 8w (see FIG. 5). That is, if the detection abnormality of the weld characteristic amount P from the captured image V continues longer than the predetermined period of time R, the detection abnormality determination part 23 notifies necessity of determining whether it is possible to continue welding. This notification is for notifying the detection abnormality of the weld characteristic amount P. For instance, the notification may be directed to an operator, or an output of an abnormality notification message on a display or a sound or voice notification. The detection abnormality determination part 23 may automatically send a command for stopping welding to the welding execution device 8 at the same time as the notification.

This point will be described with reference to FIG. 5. FIG. 5 is a diagram for describing the operation, in an abnormal control period Tf, of an actual relative position determination part 2 according to an embodiment of the present invention, where a normal control period Ts does not exist prior to the abnormal control period Tf by a predetermined period of time R. Further, in the embodiment depicted in FIG. 5, the (Pn−1)th control period T is the normal control period Ts, and the subsequent periods Pnth to (Pn+m−1)th are the abnormal control periods Tf. In this case, the actual relative position determination part 2 (weld characteristic amount detection part 22) cannot detect the weld characteristic amount P from the captured image V acquired in the nth to (n+m−1)th abnormal control period Tf. Furthermore, the (n+m)th control period T exceeds the above predetermined period of time R, whether it is the normal control period Ts or the abnormal control period Tf. Thus, the detection abnormality determination part 23 issues the above notification after the end of the (n+m−1)th control period T. Furthermore, the detection abnormality determination part 23 may issue a command to stop the above described welding at the same time as the notification. Furthermore, in the (Pn+1)th to (Pn+m−1)th abnormal control periods Tf in FIG. 5, the weld characteristic amount P in the normal control period Ts may be used instead.

While the weld characteristic amount P changes with time, the above predetermined period of time R is a period in which welding can be continued without control even if the weld characteristic amount P changes. After the elapse of the predetermined period of time R, the notification is issued. In this way, it is possible to improve the reliability of welding while continuing welding as long as possible.

Furthermore, for instance, the electrode 82 can be used in welding continuously without control for a relatively long potential lifetime because the shape of the groove (wall of the weld target 9) rarely makes an abrupt change. However, the weld wire 8w is pulled out from a reel to be used, and thus the position of the weld wire 8w may change abruptly, and is easily changeable from the position in the captured image V immediately before detection of an abnormality. Thus, the potential lifetime of the weld wire 8w being able to continue without welding is relatively short. As described above, by determining the above predetermined period of time R according to the weld characteristic amount P, it is possible to continue welding suitable to the time of abnormality detection of various weld characteristic amounts included in the weld characteristic amount P.

Further, in some embodiments, as depicted in FIGS. 3A, 3B, and 7, the welding control device 1 may further include a target position correction part 6 that corrects the target relative position Rt determined by the target relative position determination part 3, if a welding trouble phenomenon is detected. In the embodiment depicted in FIG. 7, before the target relative position Rt outputted by the target relative position determination part 3 is inputted to the position control necessity determination part 4, the correction amount outputted by the target position correction part 6 upon detection of a welding trouble phenomenon corrects the target relative position Rt. In a case where the target relative position Rt is corrected by the target position correction part 6, a corrected target relative position Rt' and the actual relative position Rr are inputted to the position control necessity determination part 4.

Furthermore, the above welding trouble phenomenon is a phenomenon such as molten droplets that occur when the tip of the weld wire 8w is not in the molten pool 8m, and butting collision of the tip of the weld wire 8w and the weld target 9 at the bottom of the molten pool 8m. The molten droplet is a ball of liquid-phase metal formed by melting of the weld wire 8w, that falls into the molten pool 8m, due to melting of the tip of the weld wire 8w from arc heat in a state where the tip of the weld wire 8w is lifted upward due to bending and is not inserted in the molten pool 8m. For instance, it is possible to detect the lifted state of the tip of the weld wire 8w from the molten pool 8m, by detecting droplets through image processing of the captured image V. When the tip of the weld wire 8w is lifted upward from the molten pool 8m due to bending or the like of the weld wire 8w, the weld wire 8w may fail to completely melt and collide with the electrode 82. When the weld wire 8w collides with the electrode 82, the electrode 82 and the weld wire 8w may cause short-circuit and arc discharge may be suspended, or the electrode 82 may break down.

As described above, in a case where droplets occur when the tip of the weld wire 8w is not in the molten pool 8m, it is necessary to bring the tip of the weld wire 8w to be in contact with the molten pool 8m. Thus, it is necessary to move the tip of the weld wire 8w downward. Furthermore, in a case where butting collision of the tip of the weld wire 8w and the weld target 9 at the bottom of the molten pool 8m occurs, it is necessary to move the tip of the weld wire 8w upward so as to stop collision.

Furthermore, the position control of the weld wire 8w at the time of detection of a welding trouble phenomenon is to be performed separately from the position control of the weld wire 8w for bringing the actual relative position Rr to the target relative position Rt, the two controls are directed in opposite directions, one control being directed downward and the other control being directed upward, for instance, which may cause control hunting.

Thus, as depicted in FIG. 7, it is possible to avoid the above described hunting by correcting the target relative position Rt on the basis of a welding trouble phenomenon.

Figure 8:
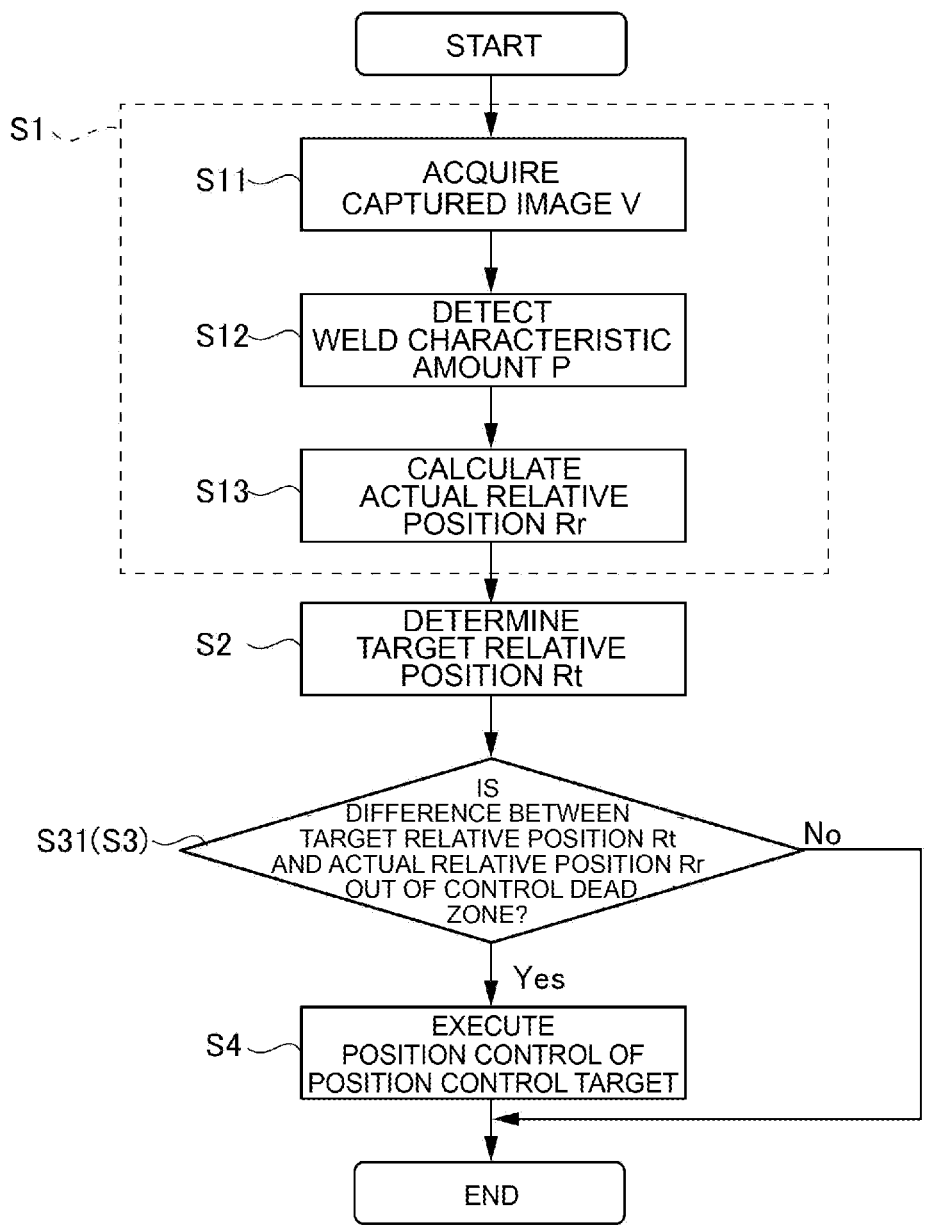
FIG. 8 is a diagram showing the method of controlling welding according to an embodiment of the present invention.

Hereinafter, the welding control method corresponding to the above described welding control device 1 (welding control program) will be described with reference to FIG. 8. FIG. 8 is a diagram showing the method of controlling welding according to an embodiment of the present invention.

The welding control method is a method of controlling the position of the position control target 8T including at least one of the weld wire 8w used in welding of the weld target 9, or the electrode 82 for melting the weld wire 8w. As depicted in FIG. 8, the welding control method includes an actual relative position determination step (S1) (actual position determination step), a target relative position determination step (S2) (target position determination step), and a position control step (S4). Furthermore, the welding control method may include a position control necessity determination step (S3), as depicted in FIG. 8.

The welding control method will be described along the steps with reference to FIG. 8. The flow of FIG. 8 is executed repeatedly, for instance periodically, for instance, during a welding work.

In step S1 of FIG. 8, the actual relative position determination step is executed. The actual relative position determination step (S1) is a step of determining the above described actual relative position R, on the basis of the captured image V. The actual relative position determination step (S1) is similar to the process executed by the actual relative position determination part 2 described above, and thus not described here in detail. In the embodiment depicted in FIG. 8, the captured image V is acquired from the above described capturing part 83 in step S11 (captured image acquisition step), the above described weld characteristic amount P is detected from the captured image V in step S12 (weld characteristic amount detection step), and the above actual relative position Rr is calculated on the basis of the weld characteristic amount P in step S13 (calculation step).

At this time, in some embodiments, the welding control method may further include a detection abnormality determination step (not depicted) for determining detection abnormality of the weld characteristic amount P in the weld characteristic amount detection step (S12). The detection abnormality determination step is similar to the process executed by the detection abnormality determination part 23 described above, and thus not described here in detail.

In step 2, the target relative position determination step is executed. The target relative position determination step (S2) is a step of determining the above described target relative position Rt. The target relative position determination step (S2) is similar to the process executed by the target relative position determination part 3 described above, and thus not described here in detail. In some embodiments, the target relative position Rt may be determined by a method using the above described machine learning.

In step S3, the position control necessity determination step is executed. The position control necessity determination step (S3) is a step of determining the necessity of the position control of the position control target 8T on the basis of the difference between the target relative position Rt and the actual relative position Rr. The position control necessity determination step (S3) is similar to the process executed by the position control necessity determination part 4 described above, and thus not described here in detail. In the embodiment depicted in FIG. 8, in step S31, it is determined whether the difference between the target relative position Rt and the actual relative position Rr is out of the above described control dead zone. If it is determined that the difference is out of the control dead zone, it is determined that the position control of the position control target 8T is necessary, and the flow proceeds to the next step S4. Next, in step S31, if it is determined that the difference between the target relative position Rt and the actual relative position Rr is out of the control dead zone, it is determined that the position control of the position control target 8T is not necessary, and the flow is terminated.

In step S4, the position control step is executed. The position control step (S4) is a step of performing a position control on the position control target 8T to bring the actual relative position Rr determined in the above described actual relative position determination step (S1) to the target relative position Rt determined in the above described target relative position determination step (S2). The position control step (S4) is similar to the process executed by the position control part 5 described above, and thus not described here in detail.

Further, in some embodiments, the welding control method may further include a target position correction step of correcting the target relative position Rt determined in the target relative position determination step (S2), if a welding trouble phenomenon is detected. The target position correction step is similar to the process executed by the target position correction part 6 described above, and thus not described here in detail. Further, the target relative position determination step (S2) may be executed between step S2 and step S3 of FIG. 8 (see FIG. 7).

Embodiments of the present invention were described in detail above, but the present invention is not limited thereto, and various amendments and modifications may be implemented.

REFERENCE SIGNS LIST

1 Welding control device
10 Welding control program
M Storage device
2 Actual relative position determination part
21 Captured image acquisition part
22 Weld characteristic amount detection part
23 Detection abnormality determination part
24 Calculation part
3 Target relative position determination part
31 Weld condition acquisition part
32 Condition-based target determination part
34 Position-based target determination part
4 Necessity determination part
5 Position control part
6 Target position correction part
7 Welding device
8 Welding execution device
8T Position control target
81 Wire feeder
82 Electrode
83 Capturing part
8m Molten pool
8w Weld wire
9 Weld target
91 Groove (weld target)
C Weld condition
P Weld characteristic amount
Pm Molten pool Pw Wire position
Pb Groove position
Pe Electrode position
Rr Actual relative position
Rt Target relative position
S Constant
V Captured image
T Control period
Tf Abnormal control period
Ts Normal control period

The invention claimed is:

1. A welding control device configured to control a position control target including both a weld wire used in welding of a weld target and an electrode for melting the weld wire, the welding control device comprising:
   a processor; and
   a non-transitory memory having stored thereon instructions, which when executed, cause the processor to perform:
   determining an actual position of the position control target on the basis of a weld characteristic amount detected from a captured image captured so as to include at least the position control target, the welding characteristic amount including both a wire position of the weld wire and an electrode position of the electrode;
   determining a target position being a target of the actual position corresponding to a weld condition for welding the weld target; and
   executing a position control of the position control target to bring the actual position to the target position,
   wherein in executing the position control, the weld wire and the electrode are each configured to move relatively to each other in each of a first horizontal direction and a second horizontal direction, the first horizontal direction being a direction in which the weld target extends, the second horizontal direction being a direction orthogonal to the first horizontal direction.

2. The welding control device according to claim 1,
   wherein the captured image further includes at least one of a groove of the weld target or a molten pool formed on the groove by melting of the weld wire,
   wherein the weld characteristic amount further includes at least one of a groove position of the groove or a molten pool position of the molten pool,
   wherein the actual position includes an actual relative position being a relative position of at least one of the wire position or the electrode position with respect to the groove position or the molten pool position, and
   wherein the target position includes a target relative position being a target of the relative position corresponding to the weld condition for welding the weld target.

3. The welding control device according to claim 1,
   wherein in determining the target position, the processor performs:
   acquiring the weld condition; and
   determining the target position corresponding to the weld condition, on the basis of a relationship between a previous weld condition at the time of a previous welding and a previous position being the actual position set under the previous weld condition.

4. The welding control device according to claim 3,
   in determining the target position, the processor performs determining the target position corresponding to the weld condition by using a learning model obtained through machine learning of a plurality of sets of data in which the previous weld condition is associated with the previous position set under the previous weld condition.

5. The welding control device according to claim 2,
   in determining the target position, the processor performs determining
   the target position corresponding to the weld condition from the weld characteristic amount, on the basis of a relationship between a previous weld characteristic amount at the time of a previous welding performed under a previous weld condition at the time of the previous welding and a previous position being a relative position of the previous weld characteristic amount.

6. The welding control device according to claim 5,
   in determining the target position, the processor performs determining the target position corresponding to the weld condition from the weld characteristic amount, by using a learning model obtained through machine learning of a plurality of sets of data in which the previous weld characteristic amount and the previous position are associated.

7. The welding control device according to claim 4,
   in determining the target position, the processor performs determining the target position corresponding to the weld condition from the weld characteristic amount, by using a function or a table for obtaining the target position corresponding to the weld characteristic amount, the function or the table being generated by using the learning model.

8. The welding control device according to claim 2,
   the processor further performs determining a necessity of a position control of the position control target on the basis of a difference between the target position and the actual position,
   wherein the processor executes a position control of the position control target on the basis of a determination result of the necessity of a position control.

9. The welding control device according to claim 8,
   wherein the processor determines that the position control of the position control target is necessary, if the difference between the actual position and the target position is out of a predetermined range determined on the basis of a plurality of sets of operation history data in which a previous weld characteristic amount at the time of a previous welding is associated with presence or absence of operation of the position control target related to the previous weld characteristic amount.

10. The welding control device according to claim 1,
    wherein in determining the actual position the processor performs:
    acquiring the captured image from a capturing part configured to capture the captured image;
    detecting the weld characteristic amount from the captured image in each of a predetermined control period; and
    calculating the actual position on the basis of the weld characteristic amount.

11. The welding control device according to claim 1,
    the processor further performs correcting the target position determined if a trouble phenomenon of the welding is detected.

12. The welding control device according to claim 2,
    wherein the weld characteristic amount includes the wire position and the molten pool position of the molten pool, and wherein the position control target is composed of the weld wire.

13. The welding control device according to claim 1, wherein the weld condition includes at least one condition of an electrode current, an electrode voltage, a welding rate, a feeding amount of the weld wire per unit time, or a groove width.

14. The welding control device according to claim 1, wherein the weld condition comprises a plurality of weld conditions, and
wherein in determining the target position the processor determines the target position corresponding to the weld condition including an aggregated condition aggregating at least two of the plurality of weld conditions.

15. A welding control device configured to control a position control target including at least one of a weld wire used in welding of a weld target or an electrode for melting the weld wire, the welding control device comprising:
a processor; and
a non-transitory memory having stored thereon instructions, which when executed, cause the processor to perform:
determining an actual position of the position control target on the basis of a weld characteristic amount detected from a captured image captured so as to include at least the position control target, the welding characteristic amount including at least one of a wire position of the weld wire or an electrode position of the electrode;
determining a target position being a target of the actual position corresponding to a weld condition for welding the weld target; and
executing a position control of the position control target to bring the actual position to the target position,
wherein in determining the actual position the processor performs:
acquiring the captured image from a capturing part configured to capture the captured image;
detecting the weld characteristic amount from the captured image in each of a predetermined control period; and
calculating the actual position on the basis of the weld characteristic amount,
wherein in determining the actual position the processor further performs
determining a detection abnormality of the weld characteristic amount in each of the control period, and
wherein in determining the actual position the processor performs:
calculating, in a normal control period being the control period in which the detection abnormality is determined to be absent, the actual position on the basis of the weld characteristic amount detected from the captured image acquired in the normal control period; and
calculating, in an abnormal control period being the control period in which the detection abnormality is determined to be present, the actual position on the basis of the weld characteristic amount detected from the captured image acquired in the normal control period previous to the abnormal control period.

16. The welding control device according to claim 15, wherein the processor detects the weld characteristic amount from a plurality of captured images acquired in the respective control periods, and wherein the processor determines that the detection abnormality is present if the weld characteristic amount is not detected from the plurality of captured images acquired in the respective control periods.

17. The welding control device according to claim 16, wherein in determining the actual position the performs:
not determining, in the abnormal control period, the actual position in the abnormal control period if the normal control period does not exist within a period previous to the abnormal control period by a predetermined period of time determined in accordance with the weld characteristic amount.

18. The welding control device according to claim 15, wherein in determining the detection abnormality the processor notifies when a period after the abnormal control period and before the next first normal control period is longer than a predetermined period of time determined in accordance with the weld characteristic amount.

19. The welding control device according to claim 18, wherein in determining the detection abnormality the processor sends, to a welding execution device, an order to stop the welding of the weld target.

20. A method of controlling welding configured to control a position control target including both a weld wire used in welding of a weld target and an electrode for melting the weld wire, the method comprising:
determining an actual position of the position control target on the basis of a weld characteristic amount detected from a captured image captured so as to include at least the position control target, the weld characteristic amount including both a wire position of the weld wire and an electrode position of the electrode;
determining a target position being a target of the actual position corresponding to a weld condition for welding the weld target; and
executing a position control of the position control target to bring the actual position to the target position,
wherein in executing the position control, the weld wire and the electrode are each configured to move relatively to each other in each of a first horizontal direction and a second horizontal direction, the first horizontal direction being a direction in which the weld target extends, the second horizontal direction being a direction orthogonal to the first horizontal direction.

21. The method of controlling welding according to claim 20,
wherein the captured image further includes at least one of a groove of the weld target or a molten pool formed on the groove by melting of the weld wire,
wherein the weld characteristic amount further includes at least one of a groove position of the groove or a molten pool position of the molten pool,
wherein the actual position includes an actual relative position being a relative position of at least one of the wire position or the electrode position with respect to the groove position or the molten pool position, and
wherein the target position includes a target relative position being a target of the relative position corresponding to the weld condition for welding the weld target.

22. A non-transitory memory having stored therein a welding control program configured to control a position control target including both a weld wire used in welding of a weld target and an electrode for melting the weld wire, the welding control program, which when executed, causing a computer to implement:

determining an actual position of the position control target on the basis of a weld characteristic amount detected from a captured image captured so as to include at least the position control target, the welding characteristic amount including both a wire position of the weld wire and an electrode position of the electrode;

determining a target position being a target of the actual position corresponding to a weld condition for welding the weld target; and executing a position control of the position control target to bring the actual position to the target position, wherein in executing the position control, the weld wire and the electrode are each configured to move relatively to each other in each of a first horizontal direction and a second horizontal direction, the first horizontal direction being a direction in which the weld target extends, the second horizontal direction being a direction orthogonal to the first horizontal direction.

\* \* \* \* \*